US007702403B1

(12) United States Patent
Gladwin et al.

(10) Patent No.: US 7,702,403 B1
(45) Date of Patent: Apr. 20, 2010

(54) STRUCTURE AND METHOD FOR SELECTING, CONTROLLING AND SENDING INTERNET-BASED OR LOCAL DIGITAL AUDIO TO AN AM/FM RADIO OR ANALOG AMPLIFIER

(76) Inventors: Stephen Christopher Gladwin, 2244 N. Bissell St., Chicago, IL (US) 60614; Depeng Bi, 2773 Whispering Oaks, Buffalo Grove, IL (US) 60089; Jeffrey Jonathan Spurgat, 7638 Hidden Savannah Ct., Verona, WI (US) 53593; Michael Cortopassi, 2210 N. Brighton, Arlington Heights, IL (US) 60004

( * ) Notice: Subject to any disclaimer, the term of this patent is extended or adjusted under 35 U.S.C. 154(b) by 866 days.

(21) Appl. No.: 09/709,772

(22) Filed: Nov. 10, 2000

Related U.S. Application Data

(63) Continuation-in-part of application No. 09/649,981, filed on Aug. 29, 2000, now Pat. No. 6,879,865.

(60) Provisional application No. 60/151,714, filed on Aug. 31, 1999.

(51) Int. Cl.
    G06F 17/00 (2006.01)
(52) U.S. Cl. ..................................................... 700/94
(58) Field of Classification Search .................. 700/94; 379/101.01, 90.01
    See application file for complete search history.

(56) References Cited

U.S. PATENT DOCUMENTS

| 5,787,259 | A | 7/1998 | Haroun | |
|---|---|---|---|---|
| 5,797,028 | A | 8/1998 | Gulick | |
| 5,903,259 | A | 5/1999 | Brusky | |
| 5,925,103 | A | 7/1999 | Magallanes et al. | |
| 5,926,624 | A | 7/1999 | Katz et al. | |
| 5,983,073 | A | 11/1999 | Ditzick | |
| 6,084,638 | A | 7/2000 | Hare et al. | |
| 6,263,503 | B1 * | 7/2001 | Margulis | 725/81 |
| 6,879,865 | B1 | 4/2005 | Gladwin et al. | |
| 2002/0013784 | A1 * | 1/2002 | Swanson | 700/94 |
| 2002/0040255 | A1 * | 4/2002 | Neoh | 700/94 |
| 2002/0072326 | A1 * | 6/2002 | Qureshey et al. | 455/3.02 |
| 2005/0113946 | A9 * | 5/2005 | Janik | 700/94 |

FOREIGN PATENT DOCUMENTS

WO    WO 0059120 A1 * 10/2000

OTHER PUBLICATIONS

International Search Report for Application No. PCT/US2000/023842; Applicant: Full Audio Corporation; Date of Mailing: Mar. 13, 2008; 2 pages.

International Publication and Search Report for Application No. PCT/US2000/023901; Applicant: Full Audio Corporation; Date of Mailing: Nov. 27, 2000; 14 pages.

(Continued)

*Primary Examiner*—Stella L Woo
(74) *Attorney, Agent, or Firm*—Perkins Coie LLP

(57) ABSTRACT

A system and method that allows digital audio files, either streaming or stored to be controlled and selected and provides an analog audio signal for broadcast by a radio or amplifier without interfering with the operation of the host PC. A remote device is provided which facilitates control of the system.

5 Claims, 35 Drawing Sheets

OTHER PUBLICATIONS

International Preliminary Examination Report for PCT Application No. PCT/US2000/023842; Applicant: Full Audio Corporation; Date of Completion: Nov. 16, 2002; 4 pages.

Written Opinion for PCT Application No. PCT/US2000/023842; Applicant: Full Audio Corporation; Date of Mailing: Oct. 31, 2001; 5 pages.

Non-Final Office Action for Patent Application No. 09/649,981 filed Aug. 29, 2000; Mailed on Mar. 1, 2004; 5 pages.

Notice of Allowance for Patent Application No. 09/649,981 filed Aug. 29, 2000; Mailed on Nov. 24, 2004; 4 pages.

* cited by examiner

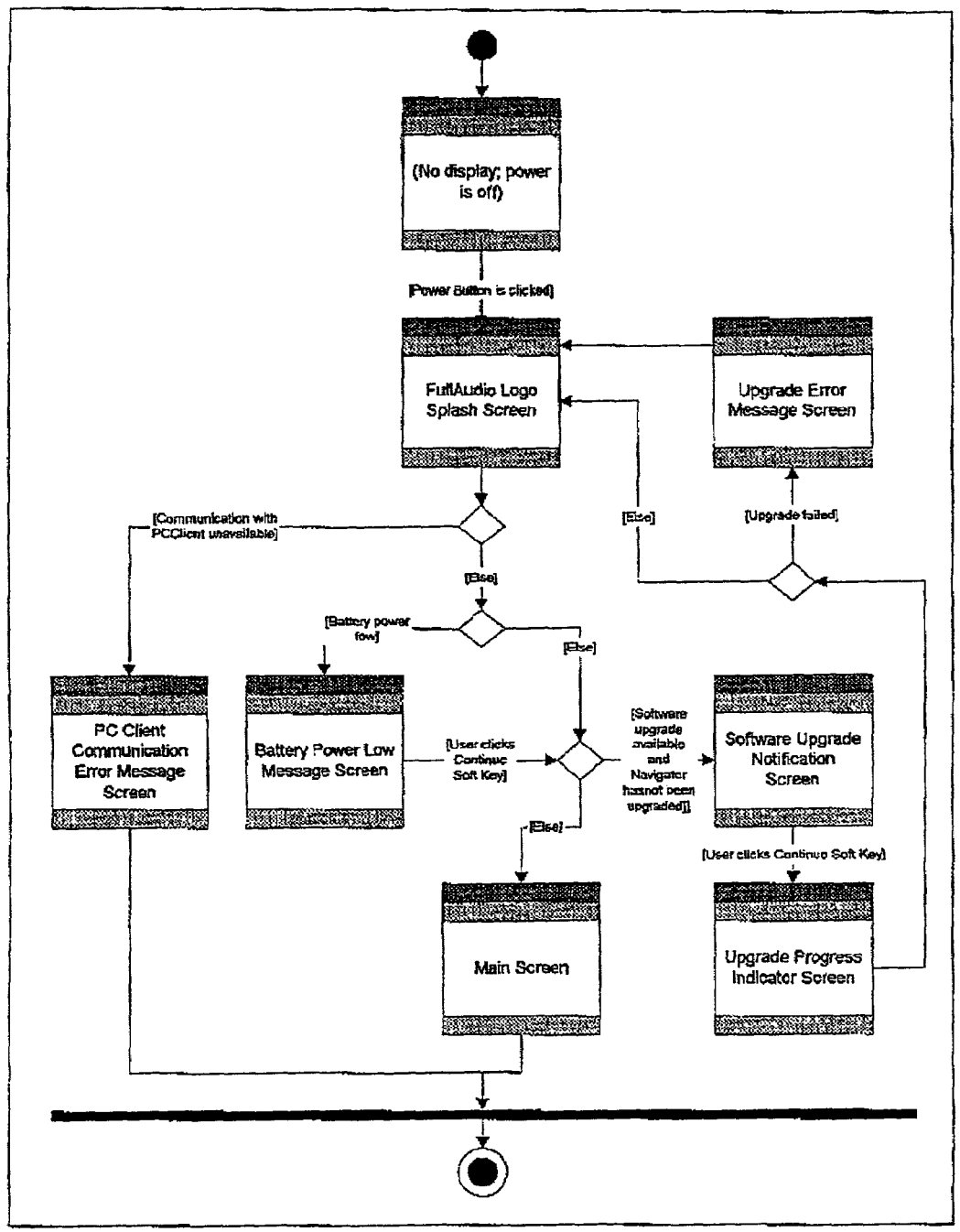
FIG 37  Scenario oriented user interaction diagram – Navigator shut down Scenario oriented user interaction diagram – Navigator power save mode and wakeup Scenario oriented user interaction diagram – Navigator main screen Scenario oriented user interaction diagram – Navigator search

STRUCTURE AND METHOD FOR SELECTING, CONTROLLING AND SENDING INTERNET-BASED OR LOCAL DIGITAL AUDIO TO AN AM/FM RADIO OR ANALOG AMPLIFIER

CROSS REFERENCE TO RELATED APPLICATIONS

This application is a continuation-in-part of commonly-owned U.S. patent application Ser. No. 09/649,981, filed on Aug. 29, 2000, now U.S. Pat. No. 6,879,865 which, in turn, claims the benefit and priority of U.S. Provisional Application No. 60/151,714 filed on Aug. 31, 1999, both hereby incorporated by reference.

BACKGROUND OF THE INVENTION

1. Field of the Invention

The present invention relates to an apparatus and a method for selecting and controlling digital audio signals from stored files or streaming digital audio signals and generating an analog signal to a remote device, such as an AM/FM radio or amplifier by way of a host personal computer (PC) without interfering with the operation of the host PC.

2. Description of the Prior Art

There is an ever-increasing amount of audio content available as digital computer files, for example in MP3 format, (like those found at www.mp3.com) or as streaming digital audio, for example, as disclosed in U.S. Pat. No. 557,943, hereby incorporated by reference. These new types of audio content can be played on a personal computer with a sound card, but cannot be played on a radio or stereo that is designed to receive and amplify analog audio signals. There are several techniques for converting a digital audio source to an analog signal that could be used by analog radio or amplifier, but these techniques interfere with the operation of the host PC and would require use of the PC to select and control the audio, for example, on an analog radio. Thus, there is a need to provide a system which enables Internet-based or digital audio to be played, for example, on an analog radio without tying up a personal computer.

SUMMARY OF THE INVENTION

Briefly, the present invention relates to a system and method that allows digital audio files, either streaming or stored, to be controlled and selected, and provides an analog audio signal for broadcast by a remote device, such as radio or amplifier, without interfering with the operation of the host PC. A remote device is provided which facilitates operation of the system.

BRIEF DESCRIPTION OF THE DRAWINGS

These and other advantages of the present invention will be readily apparent from the following specification and attached drawing wherein:

FIG. 26 is an exemplary diagram of a remote device manager in accordance with the present invention.

FIGS. 37-41 are scenario oriented user interaction diagrams.

CROSS REFERENCE TO RELATED APPLICATIONS

This application is a continuation-in-part of commonly-owned U.S. patent application Ser. No. 09/649,981, filed on Aug. 29, 2000, now U.S. Pat. No. 6,879,865 which, in turn, claims the benefit and priority of U.S. Provisional Application No. 60/151,714 filed on Aug. 31, 1999, both hereby incorporated by reference.

Figure 1:
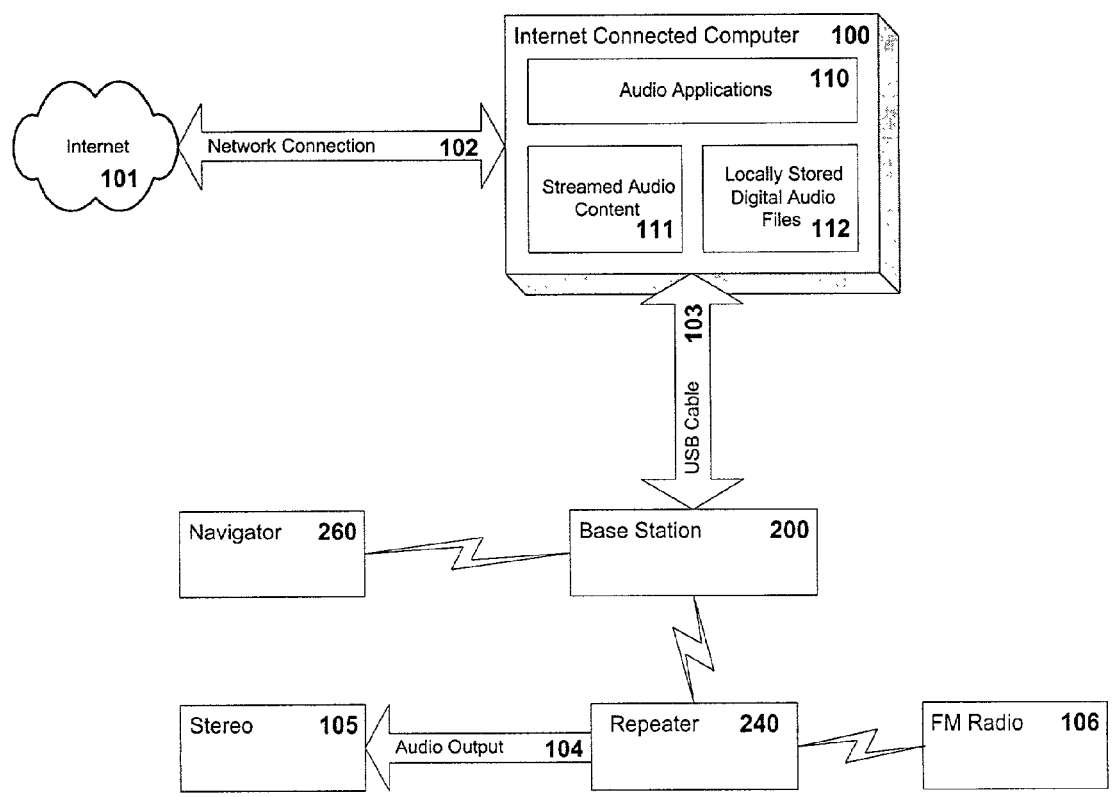
FIG. 1 is a block diagram of the system in accordance with the present invention, shown connected to a host personal computer, which, in turn, is connected to the Internet.

The present invention is adapted to interface with a host personal computer (PC) which, in turn, is adapted to be connected to virtually any web server in order to obtain audio sources. FIG. 1 shows the various components in the system and how they interact with one another. At the center of this system is a host personal computer (PC) 100 which may be connected to the Internet which acts as the home audio server. The host PC 100 is preferably a Pentium or better microprocessor running Windows 95 or better. In accordance with an important aspect of the invention, the host PC 100 may be controlled to select and play and convert various forms of digital music, for example, from the Internet or from stored digital files for broadcast by remote audio device, such as a stereo or radio, under the control of a remote device or navigator which enables the host PC to run other applications if desired. Audio applications 110 running on the Internet connected computer 100 receive streaming audio content 111, such as from Internet radio stations, from the Internet 101 over a network connection 102, through a modem or network interface card, or use locally stored audio files 112, such as MP3 encoded audio, and send this digital audio data 220 to the base station 200, through, for example, a Universal Serial Bus, or USB cable 103. The base station 200 decodes the digital audio data 220, if necessary, and then converts this decoded digital audio data 221 to analog audio signals 222. The base station 200 then transmits the analog audio signals 222 to a receiver or repeater 240. The repeater 240 provides audio output 104 for connection to an audio playback device, such as a stereo 105. The repeater 240 may also be configured to, for example, rebroadcast the audio output 104 onto an unused FM radio channel for reception by a nearby FM radio 106. The user interacts with the remote device or navigator 260 to communicate wirelessly through the base station 200 with audio applications 110 running on the Internet connected computer 100 in order to change the Internet radio station, select a music playlist, and purchase goods, among other things without interfering with the operation of the host PC 100.

Base Station and Repeater Audio Data Flow

Figure 2:
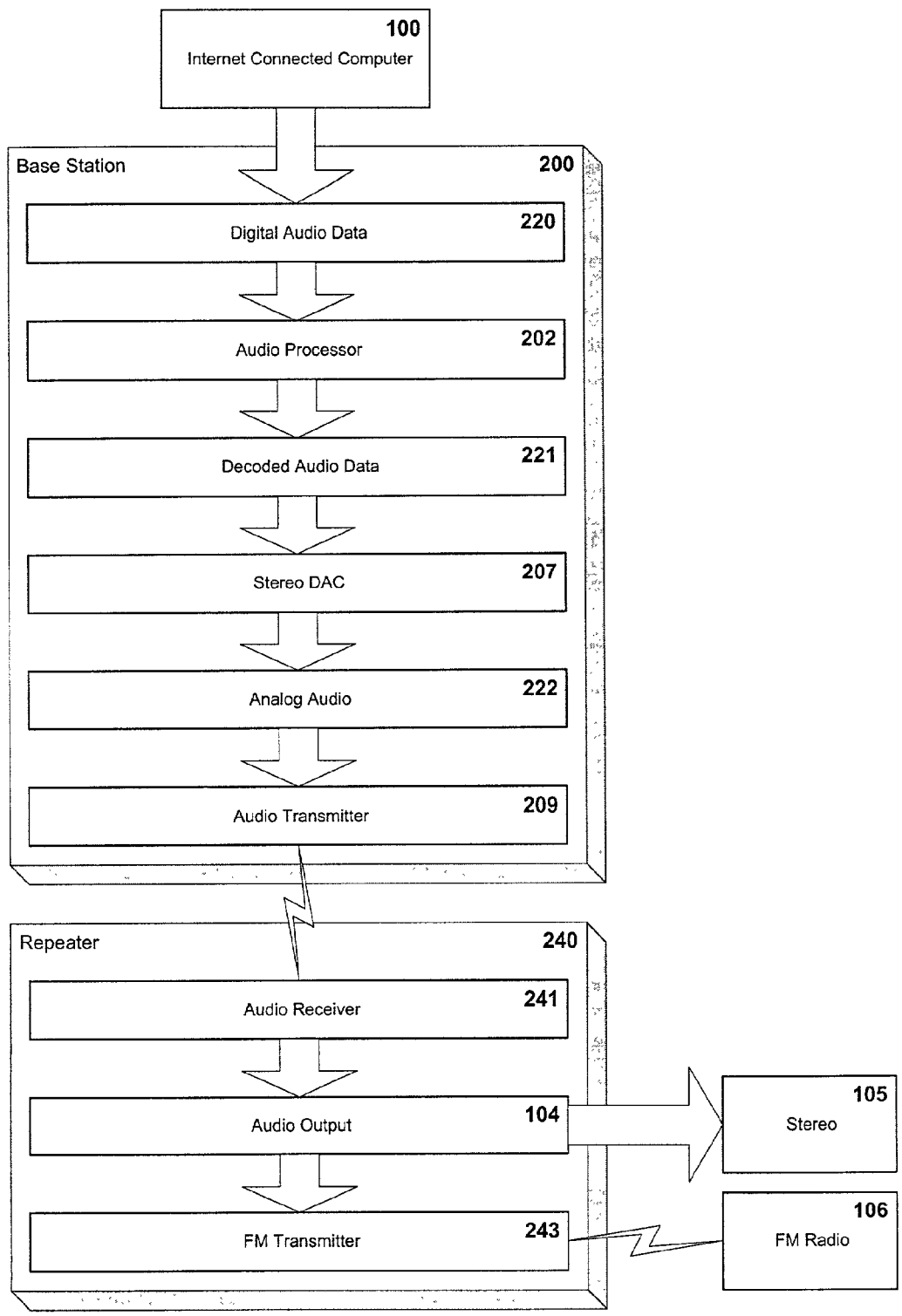
FIG. 2 is a data flow diagram of the base station which forms part of the present invention.

One of the main functions of the system is the flow of audio data from the Internet connected computer 100 through the base station 200, and finally to the repeater 240 and stereo 105 or FM radio 106. FIG. 2 diagrams the flow of audio data and the changes this data undergoes as it passes through the various components of the system. The Internet connected computer 100 sends digital audio data 220 to the base station 200. Inside the base station 200, the digital audio data 220 is passed to the audio processor 202, for example, a Texas Instruments, Model No. TMS320VC5416, for decoding, if the digital audio data 220 is in an encoded format, such as MP3. The audio processor 202 takes the decoded audio data 221 and passes it to the stereo digital to analog converter, or DAC 207, for example, a Texas Instrument, Model No. TLC320AS77C, for conversion to analog. The stereo DAC 207 passes the analog audio 222 to the audio transmitter 209, which wirelessly transmits the analog audio 222 to the repeater 240. The audio receiver 241, for example, as discussed below in connection with FIG. 14, in the repeater 240 receives the analog audio 222 and provides audio output 104 for connection to a stereo 105. The audio output 104 also goes to the FM transmitter 243, for example, as discussed below in connection with FIG. 14, for rebroadcast onto an unused FM radio channel for reception by a nearby FM radio 106.

Base Station Hardware Architecture

Figure 3:
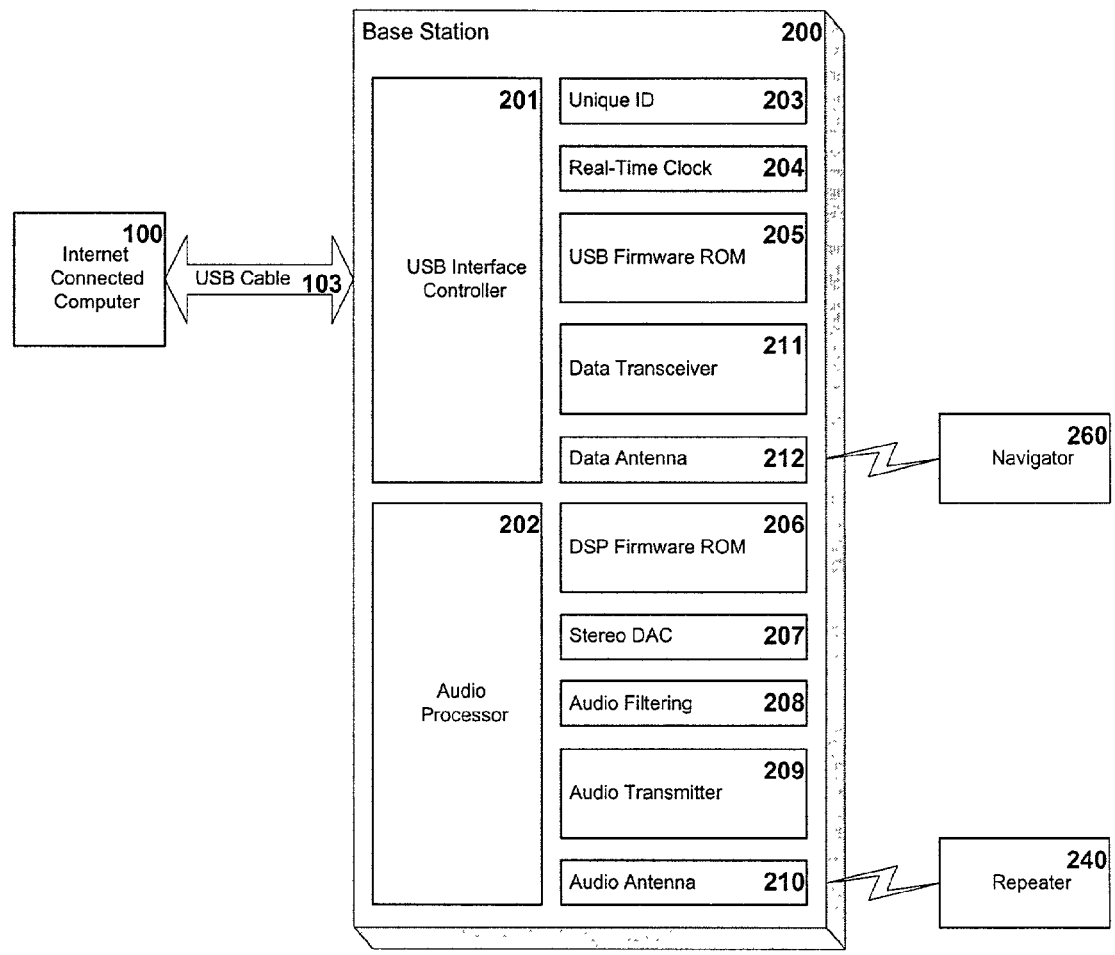
FIG. 3 is a block diagram of the base station which forms a part of this invention.

FIG. 3 shows the various functional hardware blocks within the base station 200 and how the base station 200 interacts with the other components in the system. The base station 200 may connect to an Internet connected host computer (PC) 100 through a USB cable 103. On the base station 200, the USB interface controller 201, for example, an (MFR) Model No. TUSB3200, handles communications with the host PC 100. The USB interface controller 201 reads the code it runs from the USB firmware ROM 205 described below. The USB interface controller 201 is responsible for passing digital audio data 220 from the host PC 100 to the audio processor 202 so that the digital audio data 220 can be decoded, if it is in an encoded format, such as MP3. The USB interface controller 201 also handles data communications between the host PC 100 and the navigator 260 through the data transceiver 211, which wirelessly transmits and receives the data communications. The audio processor 202 takes the digital audio data 220 and decodes it, if necessary. It then passes the decoded audio data 221 to the stereo DAC 207, which converts the decoded audio data 221 to analog audio 222. The analog audio 222 passes through some audio filtering 208 before going to the audio transmitter 209, for example, as discussed below in connection with FIG. 17, which wirelessly transmits the analog audio 222 to the repeater 240. The audio processor 202 reads the code it runs from the DSP firmware ROM 206.

Figure 42:
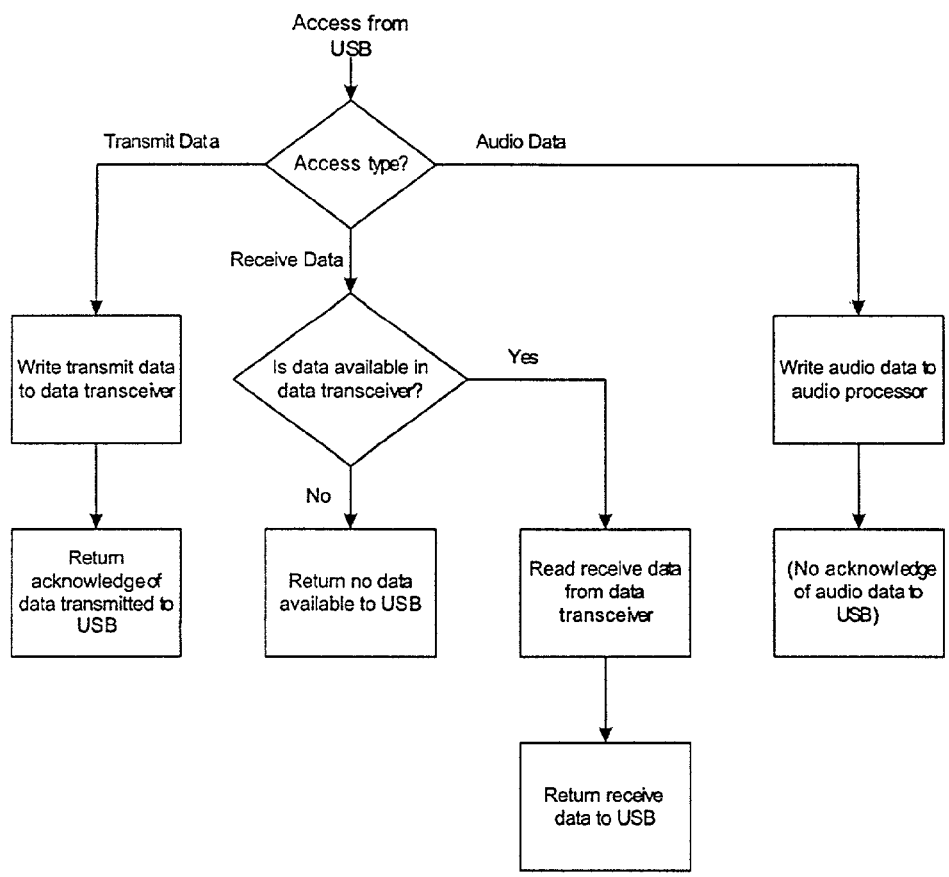
FIG. 42 is a flow diagram of the USB firmware.

FIG. 42 outlines the base station USB firmware flow. When a USB access is received from the Internet connected computer 100 to the base station 200, the USB interface controller firmware determines the type of access from the Internet connected computer 100. If the access type is for transmit data to the navigator 260, then the USB interface controller firmware writes the data to the data transceiver 211. The data transceiver 211 then transmits the data to the navigator 260. The USB interface controller firmware returns acknowledge to the Internet connected computer 100 for the data transmit access to indicate data transmission is complete. If the access type is for receive data from the navigator 260, then the USB interface controller firmware checks the data transceiver 211 to see if there is any receive data available. If there is no receive data available, then the USB interface controller firmware returns no data available to the Internet connected computer 100. If the data transceiver 211 has receive data available, then the USB interface controller firmware reads the receive data from data transceiver 211. The USB interface controller firmware then returns the receive data to the Internet connected computer 100. If the access type is audio data, the USB interface controller firmware passes the audio data directly to the audio processor 202.

Additional functionality is provided through a unique ID 203 and a real-time clock 204. The unique ID 203 allows digital audio data 220 to only be accessible from a particular base station 200 through encoding of the digital audio data 220 based on the unique ID 203 for a particular base station 200. The real-time clock 204 allows use of digital audio data 220 to expire based on the current time value in the real-time clock 204.

Navigator Hardware Architecture

Figure 4:
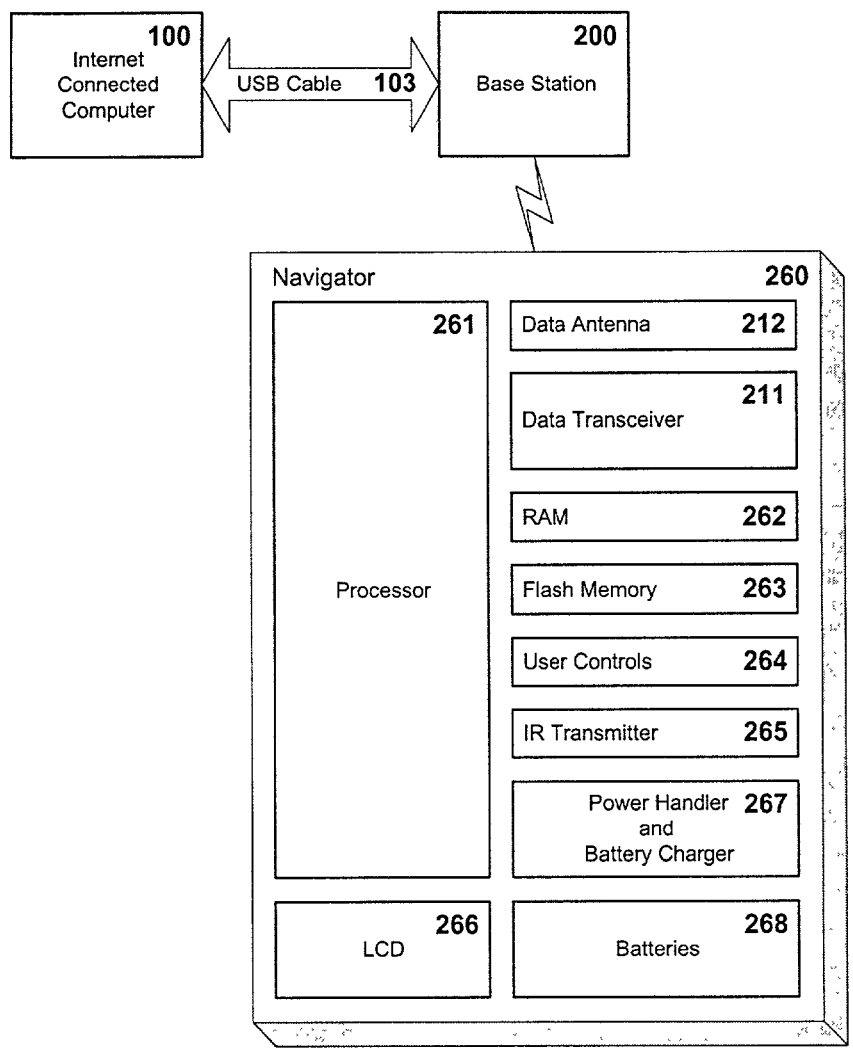
FIG. 4 is a block diagram of a remote device or navigator which forms a part of the present invention.
Figure 9:
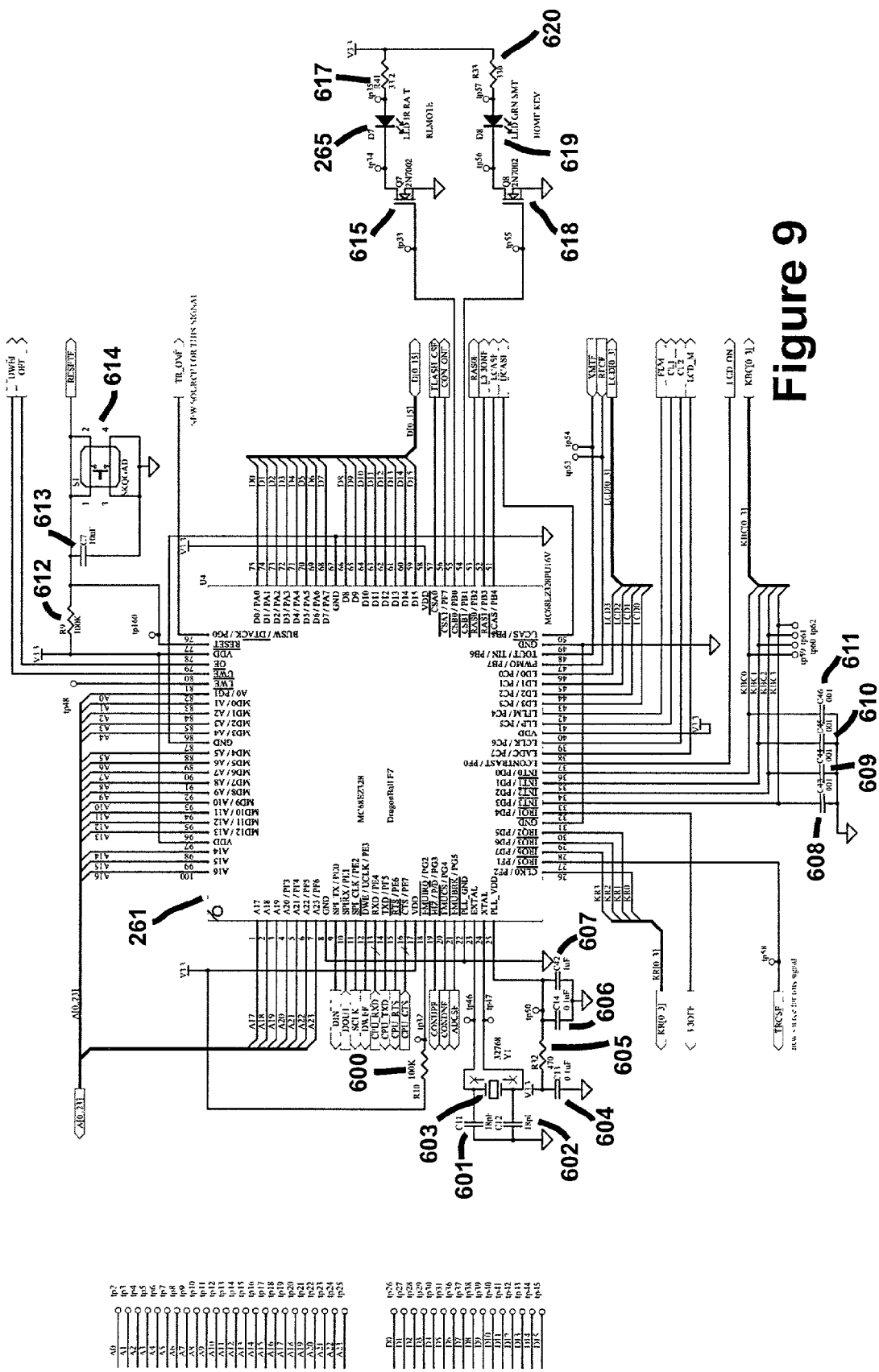
FIGS. 9-13 are schematic diagrams of the remote device in accordance with the present invention.
Figure 10:
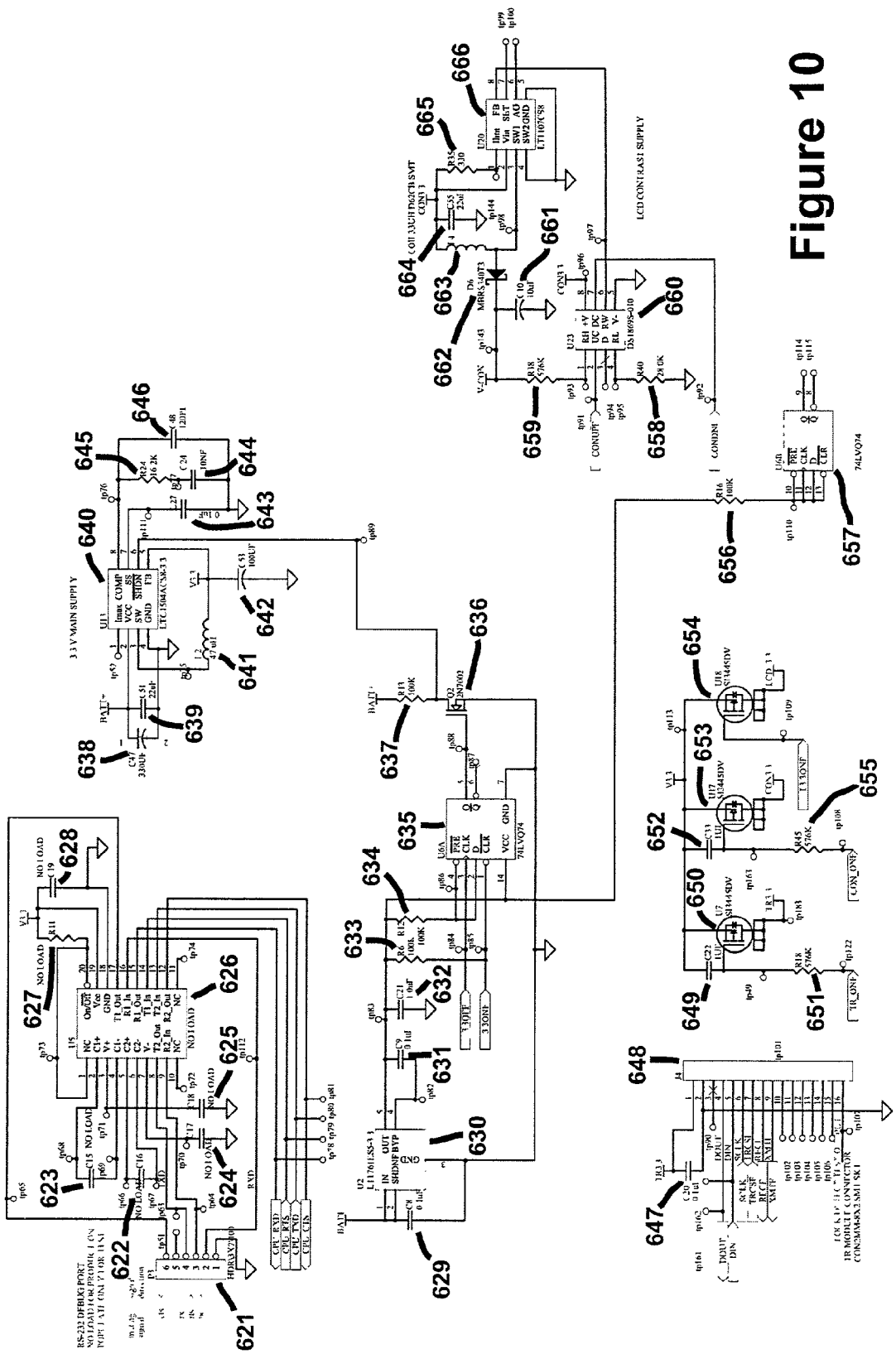
Figure 11:
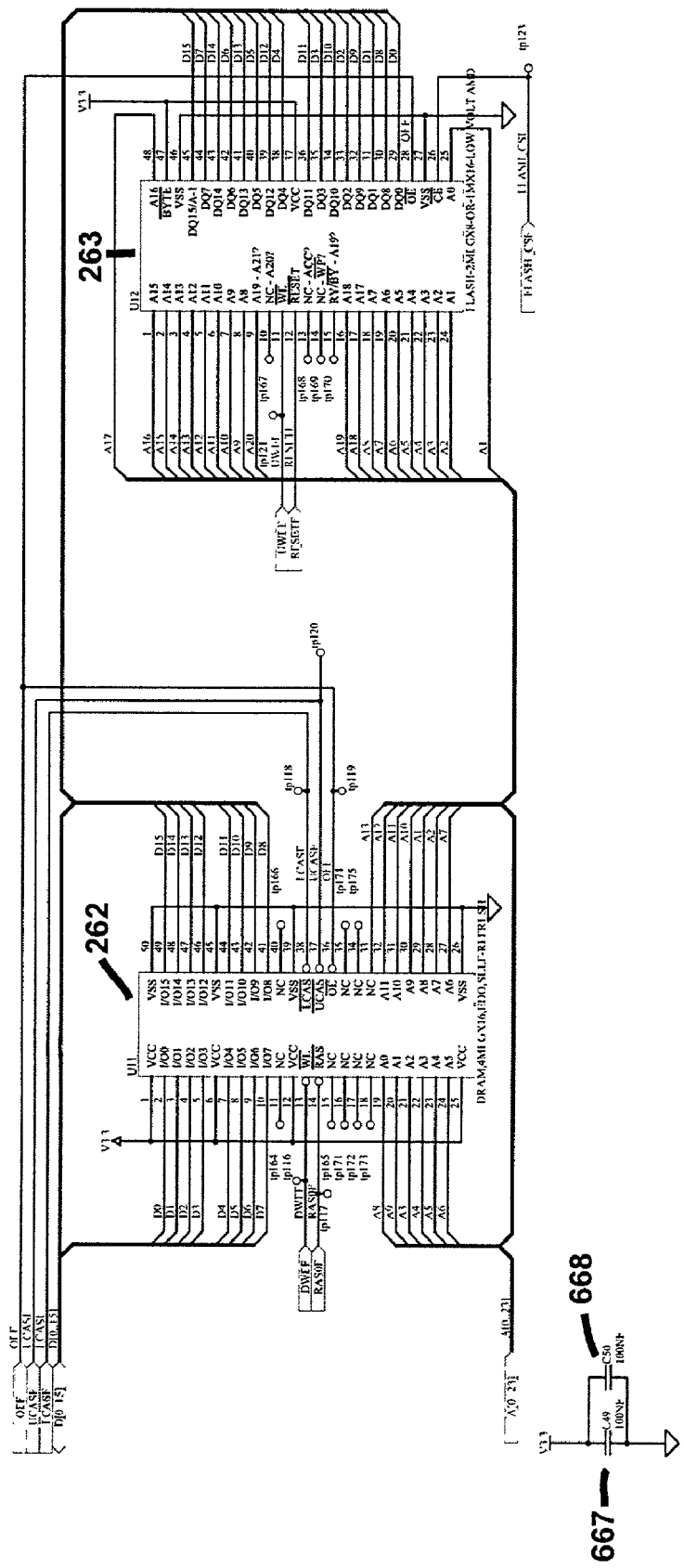
Figure 12:
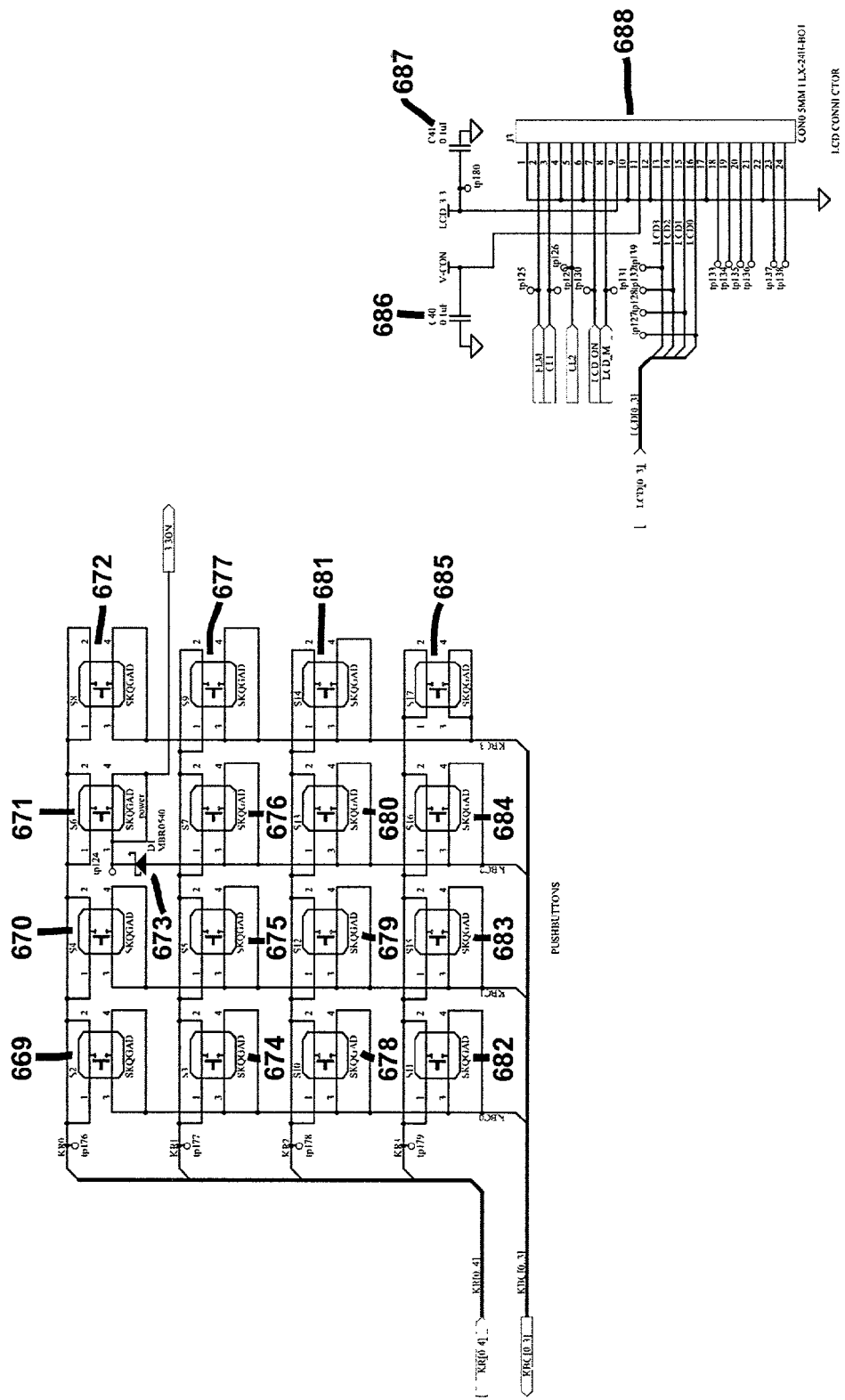
Figure 13:
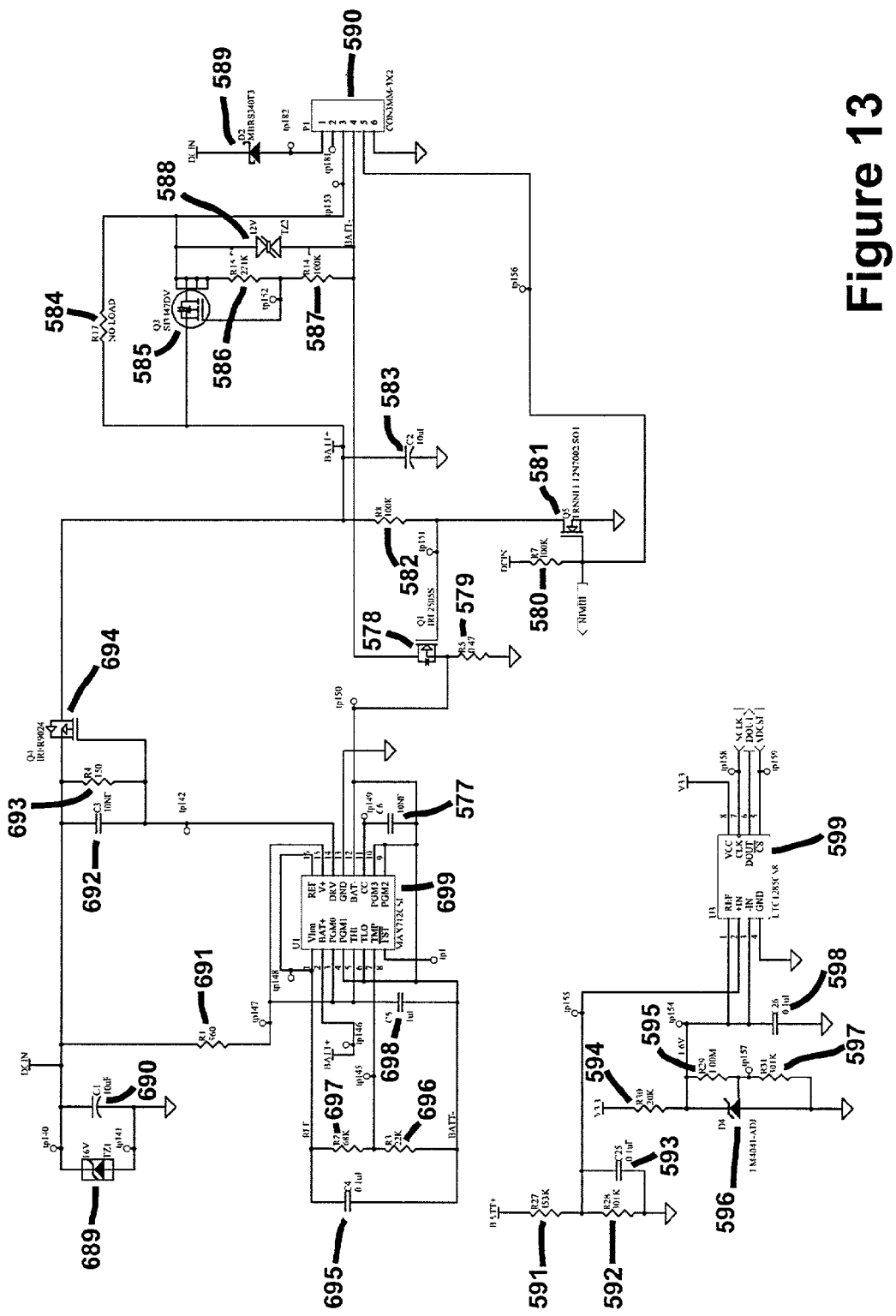

The navigator 260 (FIG. 4) acts as a remote device manager or remote control and allows the user to receive feedback from and provide input to audio applications 110 running the host PC 100. Data communications pass between the host PC 100 and the navigator 260 through the base station 200. The base station 200 is connected to the host PC 100 through a USB cable 103. The base station 200 then wirelessly transmits and receives the data communications with the navigator 260, giving the navigator 260 mobility within the range of the wireless communications. FIG. 4 illustrates this interaction between the host PC 100, the base station 200, and the navigator 260, as well as outlining the hardware functional blocks within the navigator 260. The navigator 260 receives and transmits the data communications using the data transceiver 211. This is the same type of data transceiver 211 that is used within the base station 200. The processor 261 (FIG. 9), for example, a Motorola Model No. MC68EZ328, handles the data communications with the data transceiver 211. The processor 261 takes user input from the user controls 264, which may be typically buttons and dials, and sends this information to the data transceiver 211 for wireless transmission to the base station 200 and eventually back to the audio applications 110 running on the host (PC) 100. The processor 261 receives update information from the audio applications 110 through the data transceiver 211, which the processor 261 then makes available to the user by updating the graphic information on the liquid crystal display panel, or LCD 266. The processor 261 reads the code it runs from the flash memory 263, which is also used to store information that must survive power cycling of the navigator 260. The processor 261 uses random access memory, or RAM 262, for executing code and storing volatile information, this is information that is subject to change or does not need to survive power cycling of the navigator 260.

Additional functionality may be provided through the power handler and battery charger 267, which is controlled by the processor 261 and is responsible for power management, to conserve battery life, and charging of the batteries 268. There may also be an infrared or IR transmitter 265 that allows the navigator 260 to control audio playback equipment, such as a stereo 105.

Repeater Hardware Architecture

Figure 5:
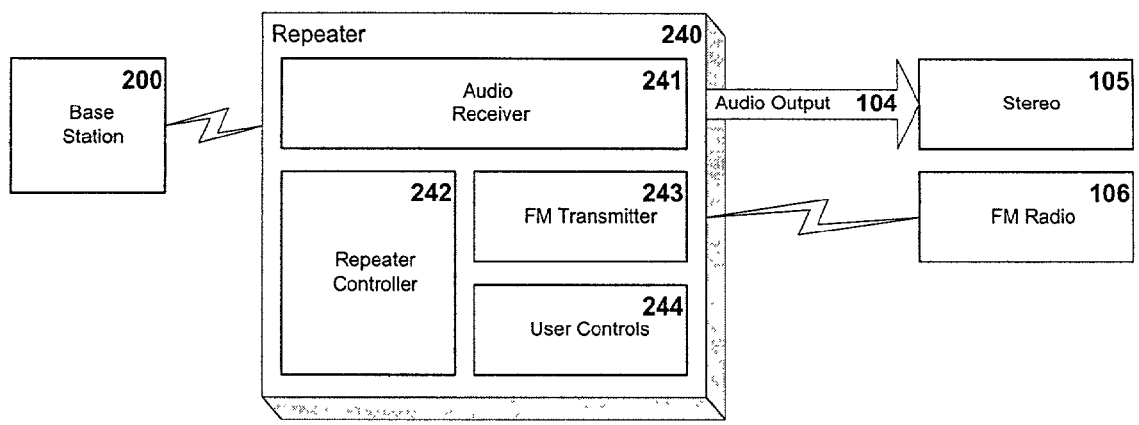
FIG. 5 is a is a block diagram of a repeater which forms part of the present invention.

The repeater 240 (FIG. 5) provides fairly straightforward hardware functionality. FIG. 5 outlines the various functional blocks within the repeater 240 and its interaction with the other components in the system. The base station 200 wirelessly transmits analog audio 222 for reception by the audio receiver 241 in the repeater 240. The audio receiver 241 provides audio output 104 for connection to a stereo 105. The audio output 104 also goes to the FM transmitter 243, which rebroadcasts the audio output 104 onto an unused FM radio channel for reception on a nearby FM radio 106.

Radio channel selection for both the audio receiver 241 and the FM transmitter 243 is handled by the repeater controller 242, which receives user inputs from the user controls 244, such as buttons. The user controls 244 indicate to the repeater controller 242 the desired user selection of a specific FM radio channel for the FM transmitter 243 to broadcast on. The user controls also indicate the desire by the user for the audio receiver 241 to scan for transmission from the base station 200 on all defined transmission frequencies.

Base Station Architecture

Figure 6:
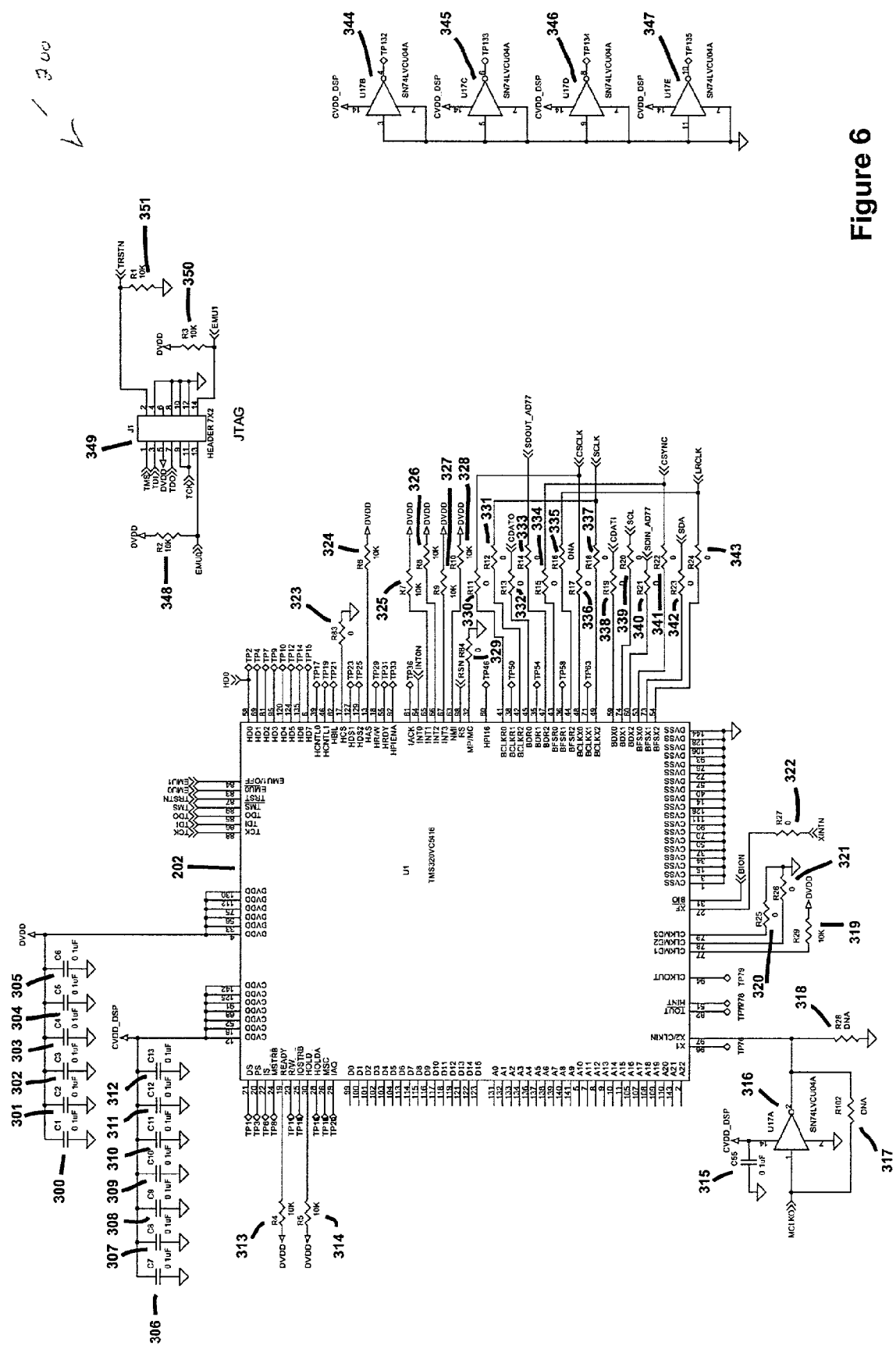
FIGS. 6-8 are schematic diagrams of the base station in accordance with the present invention.
Figure 7:
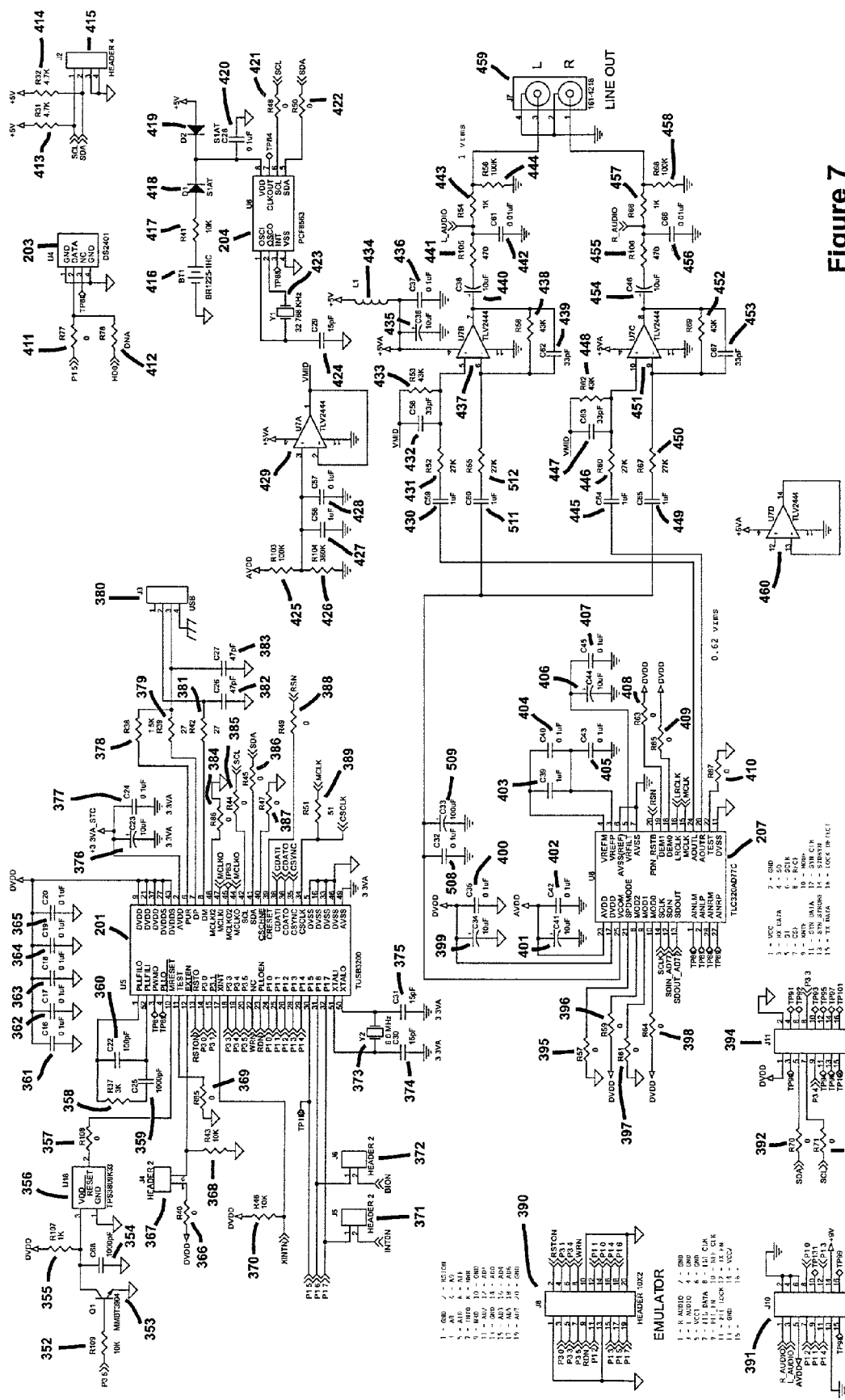
Figure 8:
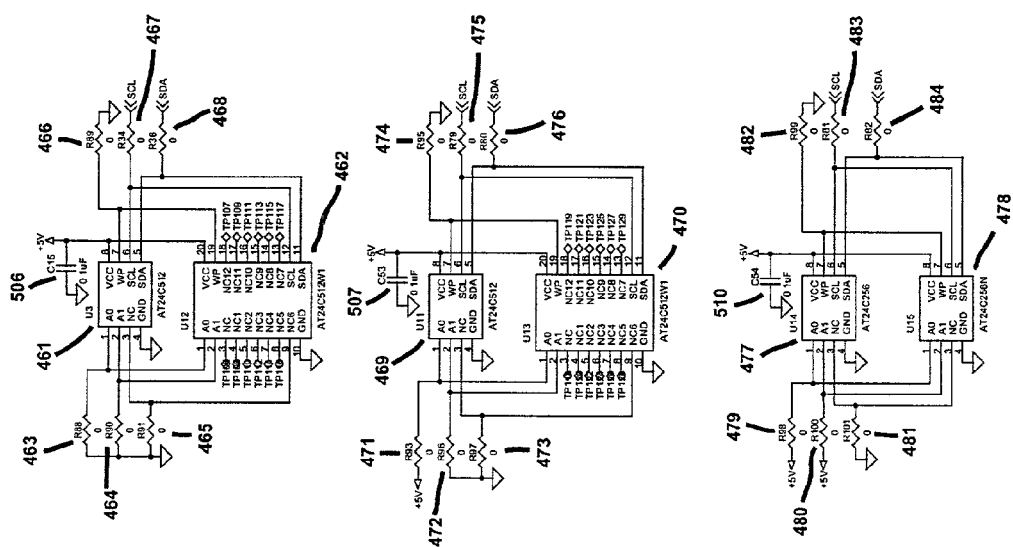

FIGS. 6-8 represent the schematic design for the base station 200 circuit board implementation example. The data transceiver 211 and data antenna 212 are part of a separate schematic design and circuit board. The data transceiver 211 circuit board module connects both electrically and mechanically to the base station 200 circuit board using the connector 394 on the base station 200. Resistors 392 and 393 are for debug purposes and provide easier debug access to the I²C bus signals used by the USB interface controller 201 to communicate with the data transceiver 211. Like the data transceiver 211, the audio transmitter 209 and the audio antenna 210 are also part of a separate schematic design and circuit board. The audio transmitter 209 circuit board module connects both electrically and mechanically to the base station 200 circuit board using the connector 391 on the base station 200. Devices 209, 210, 211 and 212 are discussed below in more detail in connection with FIGS. 15-17.

A USB cable 103 connects from the host PC 100 to the base station 200 using USB connector 380 on the base station 200. Signals from the USB connector 380 then go to the USB interface controller 201. The USB interface controller 201 in this example is, for example, Texas Instruments Model No. TUSB3200. Resistors 378, 379, and 381 and capacitors 382 and 383 provide the proper loading and electrostatic protection on the USB signals from the USB connector 380. Capacitors 361, 362, 363, 364, 365, 376, and 377 provide filtering for the power to the USB interface controller 201. A supply voltage supervisor 356, such as the Texas Instruments TPS3809, provides software controlled reset of the USB interface controller 201, a feature useful after completing an update of the USB firmware ROM 205. Resistors 352 and 355, capacitor 354, and transistor 353 complete implementation of the software controlled reset. Resistor 357 is used to provide easier access to the reset signal from the supply voltage supervisor 356 for debug. Oscillator 373 provides the clock for the USB interface controller 201 and capacitors 374 and 375 provide the loading required by the oscillator 373. Resistor 358 and capacitors 359 and 360 provide filtering for the phase locked loop, or PLL, inside the USB interface controller 201 that is used to generate additional clock signals. Resistor 389 reduces noise on the master clock signal MCLK from the USB interface controller 201 to the DAC 207. Resistors 366, 368, 369, 370, 384, and 387 provide pull-ups to power or pull-downs to ground for various signals on the USB interface controller 201. Resistors 385, 386, and 388 provide easier access to various signals on the USB interface controller 201 for debug and the headers 367, 371, and 372 provide easy connection and disconnection of signals on the USB interface controller 201 for debug.

The USB interface controller 201 reads the code it executes from USB firmware read only memory, or ROM, 205. One 256 kilobit serial ROM is used for the design implementation. The design implementation supports two different packaging sizes for the serial ROMs, so either serial ROM 477 or 478 is included. Resistors 479, 480, 481, and 482 act as pull-ups to power or pull-downs to ground for various signals to the serial ROMs 477 and 478. Resistors 483 and 484 are for debug purposes and provide easier debug access to the I²C bus signals used by the USB interface controller 201 to communicate with the serial ROMs 477 and 478. Bypass capacitor 510 provides filtering for power to the serial ROMs 477 and 478.

The audio processor 202 in this example is the Texas Instruments digital signal processor, or DSP, TMS320VC5416. The bypass capacitors 300, 301, 302, 303, 304, 305, 306, 307, 308, 309, 310, 311, and 312 provide filtering on the interface and core power supplied to the audio processor 202 from the dual output voltage regulator 494. Resistors 313, 314, 319, 320, 321, 322, 323, 324, 325, 326, 327, 328, and 329 are used as pull-ups to power or pull-downs to ground for various signals on the audio processor 202. Resistors 330, 331, 332, 333, 334, 335, 336, 337, 338, 339, 340, 341, 342, and 343 have no impedance and simply provide better debug access to the various signals going to and coming from the audio processor 202. Resistors 330, 331, 334, 335, 336, 337, 341, and 343 also allow for the selection of access to signals from one port or another on the audio processor 202, providing additional flexibility during debug of the design. Inverter 316 provides voltage level shifting of the clock signal to the audio processor 202, while resistor 317 allows the voltage level shifting to be bypassed if it is not needed. Inverter 316 and resistor 317, therefore, are mutually exclusive with only one or the other being placed on the circuit board. Capacitor 315 provides bypass capacitance on the power for the inverter 316. The audio processor 202 reads the code it executes from DSP firmware read only memory, or ROM, 206. Two 512 kilobit serial ROMs are used for the design implementation. The design implementation supports two different packaging sizes for the serial ROMs, so either serial ROMs 461 and 469 are included or 462 and 470 are included. Resistors 463, 464, 465, 466, 471, 472, 473, and 474 act as pull-ups to power or pull-downs to ground for various signals on the serial ROMs 461, 462, 469, and 470. Resistors 467, 468, 475, and 476 are for debug purposes and provide easier debug access to the I²C bus signals used by the audio processor 202 to communicate with the serial ROMs 461, 462, 469, and 470. Bypass capacitors 506 and 507 provide filtering for power to the serial ROMs 461, 462, 469, and 470.

The digital to analog converter, or DAC, 207 is implemented in this example using the Texas Instruments TLC320AD77C. Power filtering, as well as filtering of the common voltage to the amplifiers 437 and 451 is handled by the capacitors 399, 400, 401, 402, 508, and 509. Filtering for the DAC reference voltage is provided by the capacitors 403, 404, 405, 406, and 407. Resistors 395, 396, 397, 398, 408, 409, and 410 provide pull-ups to power or pull-downs to ground for various signals on the DAC 207. The analog audio 222 from the DAC 207 goes through filtering circuitry that provides a frequency band pass from roughly 20 Hz to 20,000 Hz. This band pass filtering circuitry is comprised of operational amplifiers, or op amps, 429, 437, and 451, resistors 425, 426, 431, 433, 438, 441, 443, 444, 446, 448, 450, 452, 455, 457, 458, and 512, and capacitors 427, 428, 430, 432, 439, 440, 442, 445, 447, 449, 453, 454, 456, and 511. The filtered audio goes to the audio transmitter 209 as well as to line level output connector 459. The inductor 434 and the capacitors 435 and 436 provide filtering on the power to the op amps 429, 437, and 451.

There are multiple voltage levels required by the different hardware sections in the base station 200. An external 9 to 12 volt power supply provides all power to the base station 200 and connects to the base station 200 through the power jack 485. Diode 486 provides a voltage drop and reverse polarity protection for the external power supply. Capacitor 487 provides filtering on the power from the external power supply. Since there are various voltage levels required in this specific implementation, there are multiple levels of voltage regulation. Voltage regulator 488 converts the voltage from the external power supply voltage to 5 volts. Light emitting diode, or LED, 490 provides visual feedback to the user that the base station 200 is successfully powered. Resistor 489 provides additional loading for the LED 490, to reduce the current going through the LED 490. Bypass capacitor 491 provides filtering on the 5-volt power from the voltage regulator 488. There are two additional voltage levels required in the base station 200 implementation. The first is 3.3 volts, which is used by components throughout the design. The other is a 1.5-volt core voltage for the specific audio processor 202 chosen for this design implementation. A dual output voltage regulator 494, which in this example is a Texas Instruments TPS70148, provides these two voltage levels. Capacitors 499, 500, 504, and 505 provide filtering on the power outputs from the dual output voltage regulator 494. Resistors 495, 496, and 497 are for debug purposes and allow removal of 3.3-volt power to different sections in the design. Resistors 492, 493, and 498 act as pull-ups to power or pull-downs to ground for various signals on the dual output voltage regulator 494. Ferrite beads 501, 502, and 503 provide noise filtering and isolation between the various ground planes in the base station 200 circuit board.

The unique ID 203 is implemented this example using the Dallas Semiconductor DS2401. The unique ID 203 has a single pin serial interface that can be connected to the USB interface controller 201 through the resistor 411 or to the audio processor 202 through the resistor 412. The real-time clock 204 is implemented in this example using the Philips Semiconductor PCF8563. The real-time clock 204 communicates on the I²C bus with the USB interface controller 201, with resistors 421 and 422 providing easier debug access to the I²C bus clock and data signals. Power to the real-time clock 204 is normally provided from the 5-volt regulator 488. When the external power supply is not available, the battery 416 provides power to the real-time clock 204 in order to maintain the correct time. Diode 418 prevents the 5-volt power from charging the battery 416 and diode 419 prevents the current from the battery 416 from leaking into the 5-volt power circuit. Resistor 417 provides additional loading in case the diode 418 fails. Bypass capacitor 420 provides filtering on the power to the real-time clock 204. Oscillator 423 provides a timing count for the real-time clock 204, while the capacitor 424 provides a load as required by the oscillator 423.

Connector 349 is used for connection to an external JTAG emulator. The JTAG interface connects to the audio processor 202 and is used for debugging of code running on the audio processor 202. Resistors 348, 350, and 351 are used to pull-up to power or pull-down to ground certain signals on connector 349 that go to the audio processor 202 in case the JTAG emulator is not connected. The connector 349 will be removed for production. Connector 390 is used for connection to an external 8051 emulator. The 8051 emulation interface connects to the USB interface controller 201 and is used for debugging of code running on the USB interface controller 201. The connector 390 is not used for production. Connector 415 provides easy debug access to the clock and data signals on the I²C bus, which is used by the USB interface controller 201 or audio processor 202 to access peripherals such as the real-time clock 204, USB firmware ROM 205, and DSP firmware ROM 206. Connector 415 will be removed for production. Resistors 413 and 414 are used as pull-ups to power for the I²C bus clock and data signals. Inverters 344, 345, 346, and 347 are not used, but are within a part that is being used. op amp 460 is not used, but is within a part that is being used. Resistor 318 is not used and is not placed on the circuit board.

Navigator Schematics

FIGS. 9 through 13 represent the schematic design for the navigator 260 circuit board implementation example. The data transceiver 211 and data antenna 212 are part of a separate schematic design and circuit board. The data transceiver 211 circuit board module connects both electrically and mechanically to the navigator 260 circuit board using the connector 648 on the navigator 260. Capacitor 647 on the navigator 260 provides additional filtering on the power supplied to the data transceiver 211 circuit board module.

Control of the navigator 260 rests in the processor 261, which in this example is implemented with a Motorola MC68EZ328. The processor 261 interprets the input from the user controls 264 and sends this information back to the host PC 100 through the data transceiver 211. The processor 261 also receives and interprets display update information from audio applications 110 running on the Internet connected computer 100 from the data transceiver 211. The display information is sent to the liquid crystal display panel, or LCD, 266, which connects to the navigator 260 circuit board using the connector 688 on the navigator 260. Capacitors 686 and 687 filter power going to the LCD 266 on the connector 688. The processor 261 may control an infrared LED, or IR transmitter 265, for example, a LumEx, Model No. OED-CL-1556SN, that is used to control audio playback devices, such as a stereo 105, that supports infrared control. Transistor 615 acts as a switch based on a signal from the processor 261 to enable and disable the IR transmitter 265 and the resistor 617 provides additional load to limit the amount of current to the IR transmitter 265. Another LED 619 indicates to the user that the navigator 260 is successfully powered. Transistor 618 acts as a switch based on a signal from the processor 261 to enable and disable the LED 619 and the resistor 620 provides additional load to limit the amount of current to the LED 619. Oscillator 603 provides timing to the processor, while capacitors 601 and 602 provide loading required by the oscillator 603. The reset signal of the processor 261, which is responsible for resetting the processor 261, is enabled when power is first applied to the processor 261 through a delay circuit composed of resistor 612 and capacitor 613. The button 614 also resets the processor 261 and is included for debug purposes. Capacitors 604, 606, and 607 along with resistor 605 provide filtering for the power to the phase locked loop, or PLL, circuitry within the processor 261 that is used to generate additional timing within the processor 261. Resistor 600 acts as a pull-up to power for a signal on the processor 261.

The processor 261 uses external random access memory, or RAM, 262, which can come in a 4 megabyte by 16-bit configuration, for executing code and for storing information that doesn't need to survive a power down of the navigator 260. The processor 261 also uses external flash memory 263, which can come in a 1 megabyte by 16-bit configuration, for storing the code to be executed as well as storing information that must survive a power down of the navigator 260. The capacitors 667 and 668 provide filtering for the power to the RAM 262 and flash memory 263.

The user controls 264 may be composed of a set of 16 buttons 669, 670, 671, 672, 674, 675, 676, 677, 678, 679, 680, 681, 682, 683, 684, and 685 (FIG. 12), which may be arranged in a 4×4 array and scanned by the processor 261. This reduces the number of signals required on the processor 261 to support the user controls 264. Capacitors 608, 609, 610, and 611 act to reduce voltage spikes on the return signals from the user controls 264 to the processor 261 when the user controls 264 are activated and deactivated.

Button 671 may be used to turn power on to the entire navigator 260. The button 671 is always powered, even when power is turned off to the rest of the navigator 260. Diode 673 prevents current leakage from button 671 when the rest of the navigator 260 is turned off. The 3.3-volt regulator 630 provides power to the button 671 as well as a flip-flop 635 that is also always on to receive the power on signal from the button 671. Capacitors 629, 631, and 632 provide filtering for power to the always on button 671 and flip-flop 635. Resistors 633 and 634 act as pull-ups to power for signals to the flip-flop 635. Resistor 637 and transistor 636 work together with flip-flop 635 to control the shut down of the 3.3-volt switcher 640 that provides power to the rest of the navigator 260. Capacitors 638, 639, 642, and 643 provide filtering for power to and from the switcher 640. Inductor 641 completes a feedback circuit required by the switcher 640. Resistor 645 and capacitors 644 and 646 provide external compensation circuitry also required by the switcher 640.

The battery 268 provides power to the navigator 260 and connects to the navigator 260 through the connector 590 on the navigator 260. Diodes 588, and 589, transistor 585, and resistors 586 and 587 provide over-voltage protection from the battery 268 and also protect against the battery 268 being plugged incorrectly into the connector 590. This protection can be bypassed by including resistor 584. The navigator 260 supports recharging of the battery 268 through a battery charger 267. The battery charger 267 is composed of a battery charge controller 699, which in this example is a Maxim Integrated Products MAX712CSE, along with the required support circuitry. The support circuitry required by the battery charge controller 699 is composed of diode 689, transistor 694, resistors 691, 693, 696, and 697, and capacitors 577, 583, 690, 692, 695, and 698. Resistors 579, 580 and 582 and transistors 578 and 581 detect if the battery 268 is rechargeable and provide this signal to the battery charge controller 699 to prevent the battery charger 267 from trying to charge a non-rechargeable battery 268.

The analog to digital converter 599, for example, a (MFR) Model No. LTC1285C58 along with diode 596, capacitors 593 and 598, and resistors 591, 592, 594, 595, and 597 are used by the processor 261 to monitor the battery 268 voltage level for calculating battery life and controlling battery charging. Using transistors 650, 653, and 654, capacitors 649 and 652, and resistors 651 and 655, the processor 261 can individually control power to the data transceiver 211 and the LCD 266 as part of power management to increase battery life on the navigator 260. In addition, the processor 261 is able to control the voltage level for the contrast power supplied to the LCD 266, which allows user control of display contrast. To do this, the processor 261 adjusts a digital potentiometer 660, for example, a Dallas Semiconductor Model No. DS1869-S-010, which outputs a variable voltage level based on a voltage divider circuit made up of resistors 658 and 659. This variable voltage level feeds a DC to DC converter 666, which takes this voltage level as an input to determine the contrast supply voltage level that is output to the LCD 266. Resistor 665, inductor 663, and diode 662 fulfill requirements of the DC to DC converter 666. Capacitors 661 and 664 provide filtering for the contrast power supply to the LCD 266.

Connector 621 is used for debug access to the processor 261. The debug port is implemented as an industry standard RS-232 serial port. The RS-232 interface controller 626, for example a Sipex Corp., Model No. SP385ACA, handles the required RS232 interface level conversions. Capacitors 622, 623, 624, 625, and 628 provide filtering for power for the various voltage levels used by the RS-232 interface controller 626. Resistor 627 acts as a pull-up to power for the ON signal to the RS-232 interface controller 626. None of the processor 261 debug port components 621, 622, 623, 624, 625, 626, 627, and 628 are included for production. The flip-flop 657 is unused. Resistor 656 is used to pull-up to power the inputs of the unused flip-flop 657.

Repeater Schematics

Figure 14:
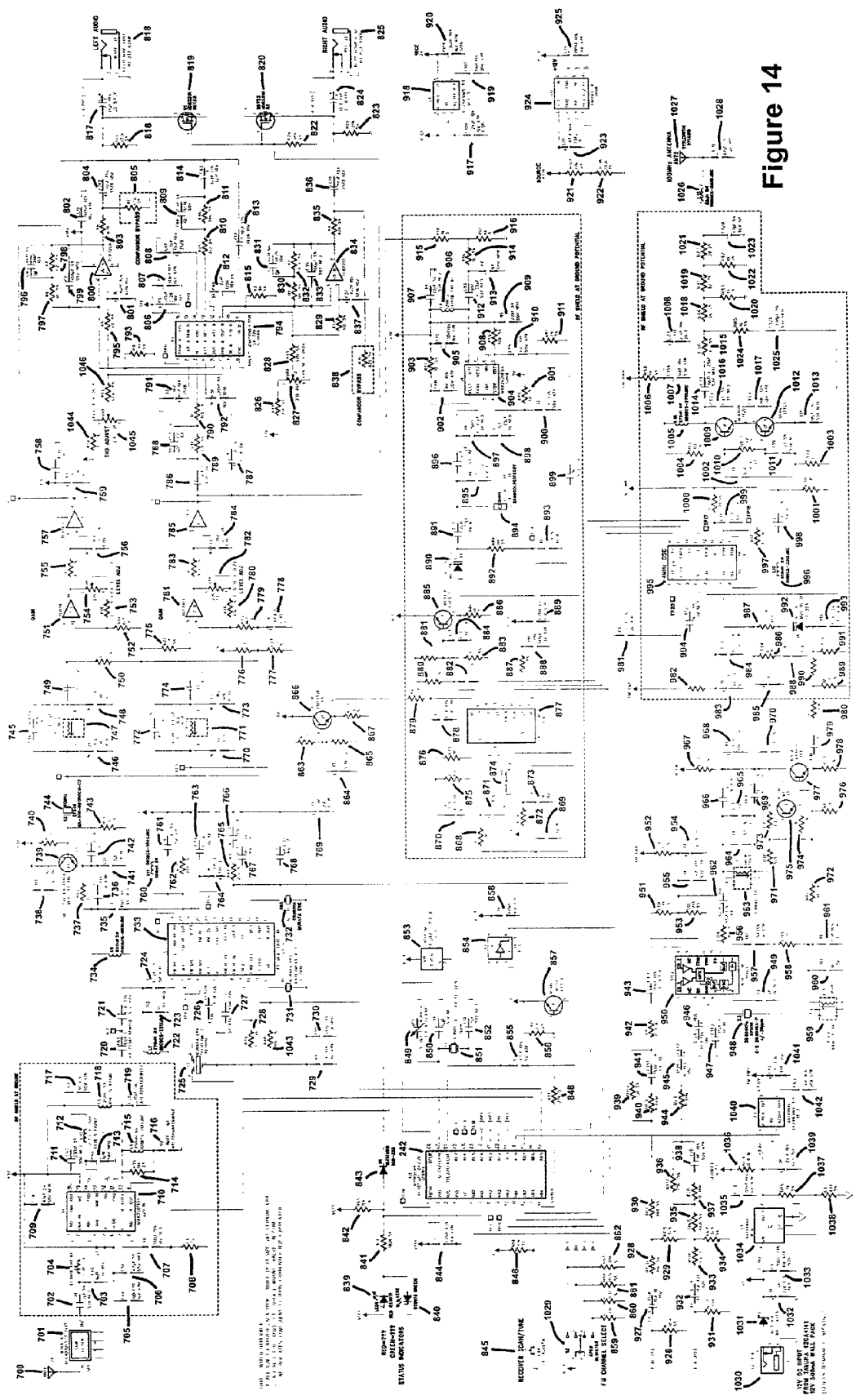
FIG. 14 is a schematic diagram of the repeater in accordance with the present invention.

FIG. 14 represents the schematic design for the repeater 240 circuit board implementation example. As shown in FIG. 5, the repeater 240 is composed of four sections, the repeater controller 242, the user controls 244, the audio receiver 241, and the FM transmitter 243. The repeater controller 242, which in this example is a Microchip PIC16C57, interprets the selections for the user controls 244. Switch 1029 selects the FM transmission frequency, with resistors 859, 860, 861, and 862 acting as pull-downs to ground for the switch 1029 selections. Switch 845 signals that the audio receiver 241 should scan through the audio transmission frequencies for a wireless audio transmission signal from the base station 200 to lock to. Resistor 846 acts as a pull-up to power for the switch 845. LEDs 839 and 840 signal to the user the status of receiving an audio transmission from a base station 200 by the audio receiver 241 on the repeater 240. Resistor 841 provides additional loading to limit the current to the LEDs 839 and 840, while resistor 842 acts as a pull-up to power for the status signal that controls the LEDs 839 and 840. Voltage detector 853, for example, a Telcom, Model No. TC54VC2702ECB, generates the reset signal to the repeater controller 242 to reset the repeater controller 242. Oscillator 851 provides the timing for the repeater controller 242. Capacitors 850 and 852 and variable capacitor 849 provide the required loading for the oscillator 851. Capacitor 844 provides filtering for power to the repeater controller 242.

Wireless audio transmissions from the base station 200 come to the repeater 240 through the audio antenna 700, for example, a 22AWG solid wire, on the repeater 240. The audio signal first passes through SAW filter 701, for example, a Murata Model No. SAFC927MF9OT-TC12, which acts as a band pass filter. The signal then feeds into the low noise amplifier, or LNA, and down converter mixer 710, which in this example is a Maxim Integrated Products MAX2685. The LNA and down converter mixer 710 down converts the audio signal for use by the FM stereo receiver and decoder 733. Capacitors 702 and 703 and inductor 704 provide impedance matching of the signal to the input of the LNA inside the LNA and down converter mixer 710. Capacitors 711 and 713 and inductor 712 provide impedance matching from the output of the LNA inside the LNA and down converter mixer 710 to the input of the mixer, also inside the LNA and down converter mixer 710. The down converted audio output signal from the LNA and down converter mixer 710 then passes through an impedance matching and filtering circuit composed of the capacitors 716, 717, 719, 720, 721, 723, and 724, resistor 714, and inductors 715, 718, and 722. Capacitors 705, 706, 709 provide filtering for power to the LNA and down converter mixer 710. The local oscillator used by the LNA and down converter mixer 710 comes from the voltage controlled oscillator, or VCO. The VCO circuit is composed of resistors 708, 892, 901, 908, 911, 914, 915, and 916, capacitors 707, 891, 893, 895, 896, 897, 898, 899, 900, 907, 909, 910, 912, and 913, varactor 890, inductor 906, ceramic resonator 894, and RF oscillator 904. Resistor 903 and capacitors 902 and 905 provide filtering for power to the RF oscillator 904. The frequency synthesizer 877, which in this example is a National Semiconductor LMX2316TM, controls the VCO circuit. The repeater controller 242 selects the frequency of the frequency synthesizer 877 through a serial interface with the frequency synthesizer 877, for example, a National Semiconductor, Model No. LMX 2316TM. The repeater controller 242 also provides the reference frequency for the frequency synthesizer 877 from the oscillator 851. The reference frequency is filtered by capacitor 855 before going to the frequency synthesizer 877. Resistors 868, 875, 876, and 887 and capacitors 869, 870, 871, 874, 888, and 889 provide additional support for the frequency synthesizer 877. Resistors 881, 883, and 886, capacitor 884, and transistor 885 act as a frequency synthesis PLL lock detect circuit to provide PLL lock detection feedback to the repeater controller 242 when receive frequency changes are made. Transistor 866, capacitors 864 and 878, and resistors 863, 865, 867, and 879 provide filtering for power to the charge pump inside the frequency synthesizer 877. Resistors 872 and 880 and capacitors 873 and 882 provide filtering for digital power to the frequency synthesizer 877. The down converted audio signal then goes to the FM tuner 733, which in this example is a Toshiba TA8122. The FM tuner 733 does the multiplexed decoding and a final level of down conversion of the audio signal to base band. Oscillator 744 along with resistors 737, 740, and 743, capacitors 735, 736, 738, 741, and 742, transistor 739, and inductor 734 provide the reference timing for the down conversion handled in the FM tuner 733. Oscillator 731 provides the reference frequency for the FM stereo decoding handled in the FM tuner 733. Oscillator 732 provides the reference frequency to the FM tuner 733 for synchronization with the pilot tone in the audio signal. Resistors 728, 762, 765, and 1043, capacitors 726, 727, 729, 730, 761, 763, 764, 766, 767, 768, and 769, inductor 760, and ceramic filter 725 provide additional support for the FM tuner 733. Resistors 848 and 856 and transistor 857 allows the repeater controller 242 to force the FM tuner 733 to output mono instead of stereo, however, the FM tuner 733 normally outputs stereo audio signals. The stereo audio signals output from the FM tuner 733 first pass through a pilot trap filter to remove the pilot tone from the stereo audio signals. The pilot trap filter is composed of capacitors 745, 746, 748, 770, 772, and 773, and variable inductors 747 and 771. The stereo audio signals then pass through a gain control circuit, which is composed of resistors 750, 752, 753, 775, 776, 777, 779, and 780, variable resistors 754 and 782, capacitors 749, 774, and 778, and op amps 751 and 781. The stereo audio signals then pass through a de-emphasis circuit to restore the high frequencies in the signals. Resistors 755 and 783, capacitors 756 and 784, and op amps 757 and 785 make up the de-emphasis circuit. Capacitors 758 and 759 provide power filtering for the op amps 751, 757, 781, and 785. The stereo audio signals next pass through a dynamic range decompression circuit to match the compression done in the audio transmitter 209 in the base station 200. The compandor 794, which in this example is a Philips Semiconductor SA572, is configured to operate for decompression. Resistors 789, 790, 793, 795, 797, 798, 803, 810, 811, 815, 826, 828, 829, 830, 832, 835, 1044, and 1046, variable resistors 827 and 1045, capacitors 786, 787, 788, 791, 792, 796, 799, 801, 802, 804, 808, 809, 812, 813, 814, 831, 833, 836, and 837, and op amps 800 and 834 support operation of the compandor 794. Resistors 805 and 838 provide an option to bypass the decompression circuit. Capacitors 806 and 807 provide filtering for power to the compandor 794. Resistors 816 and 823 and capacitors 817 and 824 provide final filtering on the stereo audio signals before the stereo audio signals are output on the connectors 818 and 825. Resistor 822, diode 843, and transistors 819 and 820 act as a mute control circuit for use by the repeater controller 242 to mute the stereo audio output signals.

The stereo audio output signals are also passed from the audio receiver 241 to the FM transmitter 243, also on the repeater 240, for broadcast. First, the stereo audio signals pass through a gain circuit, which is composed of resistors 926, 928, 929, 930, 931, 933, 934, and 935 and capacitors 927 and 932. Next, the stereo audio signals pass through a pre-emphasis circuit to boost the high frequencies in the signals. Resistors 936, 937, 939, 940, 942, and 944 and capacitors 938, 941, 943, and 945 make up the pre-emphasis circuit. After the pre-emphasis circuit, the audio signals go to the stereo modulator encoder 950, for example, a New Japan Radio Corp., Model No. NJM2035M, which handles the stereo encoding process that involves time division multiplexing of the stereo audio signals. A multiplexing circuit supports the stereo modulator encoder 950. The multiplexing circuit is composed of resistors 951, 952, and 953 and capacitors 954 and 955. Capacitors 946 and 947 provide additional support to the stereo modulator encoder 950. The multiplexed audio signal comes from the stereo modulator encoder 950 and passes through a low pass filter circuit. The low pass filter circuit is made up of resistor 956, capacitors 962, 964, 965, 966, and 969, and variable inductor 963. The multiplexed audio signal then goes to a summing circuit where the multiplexed audio signal is summed with the pilot tone. Oscillator 948, supported by capacitor 949, provides the timing for the generation of the pilot tone, which is required for FM radio broadcast. The pilot tone comes from the stereo modulator encoder 950 and passes through a pilot filter, composed of resistors 958 and 972, capacitors 957, 960, and 961, and variable inductor 959. The pilot tone is then goes to a summing circuit where the pilot tone is summed with the multiplexed audio signal. The summing circuit is composed of resistors 971, 973, 974, 976, 978, and 980, capacitor 979, and transistors 975 and 977. Resistor 967 and capacitors 968 and 970 provide power filtering for the summing circuit. The summed audio signal modulates the voltage controlled oscillator, or VCO, circuit to generate the FM radio signal. The VCO circuit is made up of resistors 986, 987, 989, 990, 991, 1001, 1003, 1004, and 1010, capacitors 985, 988, 993, 998, 1002, 1011, 1013, 1014, 1016, and 1017, inductors 996 and 1005, varactor 992, and transistors 1009 and 1012. Resistor 1006 and capacitors 1007 and 1008 provide filtering for power to the VCO circuit. The VCO is controlled by the phase locked loop, or PLL, which is inside the frequency synthesizer 995. The frequency synthesizer 995 in this example is the National Semiconductor LMX1601. The repeater controller 242 provides the reference frequency for the frequency synthesizer 995 through the inverter 854 and filtering capacitor 981. Capacitor 858 provides power filtering for the inverter 854. Resistors 982 and 1000 and capacitors 983, 984, and 999 provide power filtering for the frequency synthesizer 995. Resistor 997 acts as a pull-up to power to the enable signal on the frequency synthesizer 995. Capacitor 994 provides filtering on an unused output from the frequency synthesizer 995. The frequency modulated signal goes from the VCO circuit to an output gain adjustment circuit, that affects the output power of the transmission. The output gain adjustment circuit is made up of resistors 1015, 1018, 1019, 1020, 1021, 1022, and 1024 and capacitor 1025. Finally the frequency modulated signal passes through a pi filter circuit, which is responsible for removing harmonics from the transmission signal, before going to the FM transmitter antenna 1027 for broadcast to a nearby FM radio 106. The pi filter circuit is made up of capacitors 1023 and 1028 and inductor 1026.

Power to the repeater 240 comes from an external 12-volt unregulated power supply. The external power supply connects to the repeater 240 circuit board using connector 1030 on the repeater 240. Diode 1031 provides protection for the repeater 240 in case an incorrect power supply is plugged into the repeater 240 on connector 1030. The 12-volt unregulated power feeds into voltage regulator 1034. Capacitors 1032 and 1033 provide filtering for the 12-volt input to the regulator 1034. Capacitors 1035 and 1039 and resistor 1036 provide filtering for the 3.3-volt output from the regulator 1034. Resistors 1037 and 1038 provide the output voltage selection for the regulator 1034. The 12-volt unregulated power also feeds into regulator 924 to provide 10-volt power to the audio receiver 241. Capacitor 925 provides filtering for the 12-volt input to the regulator 924, while capacitor 923 provides filtering for 10-volt output from the regulator 924. Resistors 921 and 922 provide the output voltage selection for the regulator 924. Additional 3-volt power is supplied by regulator 918, with capacitor 917 acting as filter for input power, capacitor 920 acting as a filter for output power and capacitor 919 providing bypass support for the regulator 918. Regulator 1040 supplies power to the FM transmitter 243. The repeater controller 242 controls output from the regulator 1040, so the FM transmitter 243 can be selectively powered down. Capacitor 1041 provides is filtering for the power output from the regulator 1040 and capacitor 1042 provides the required bypass support for the regulator 1040.

Data Transceiver Schematics

Figure 15:
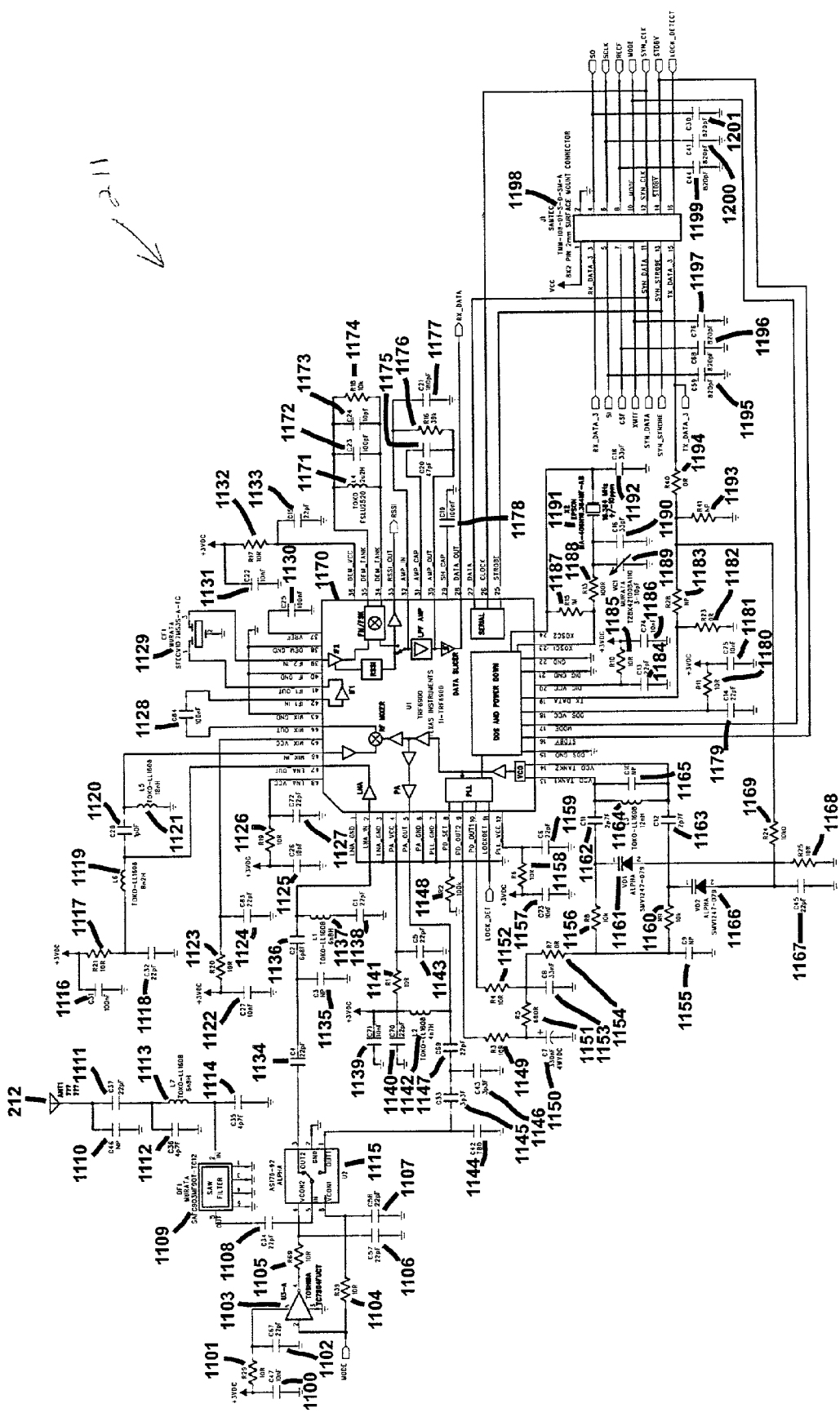
FIGS. 15 and 16 are schematic diagrams of a data transceiver in accordance with the present invention.
Figure 16:
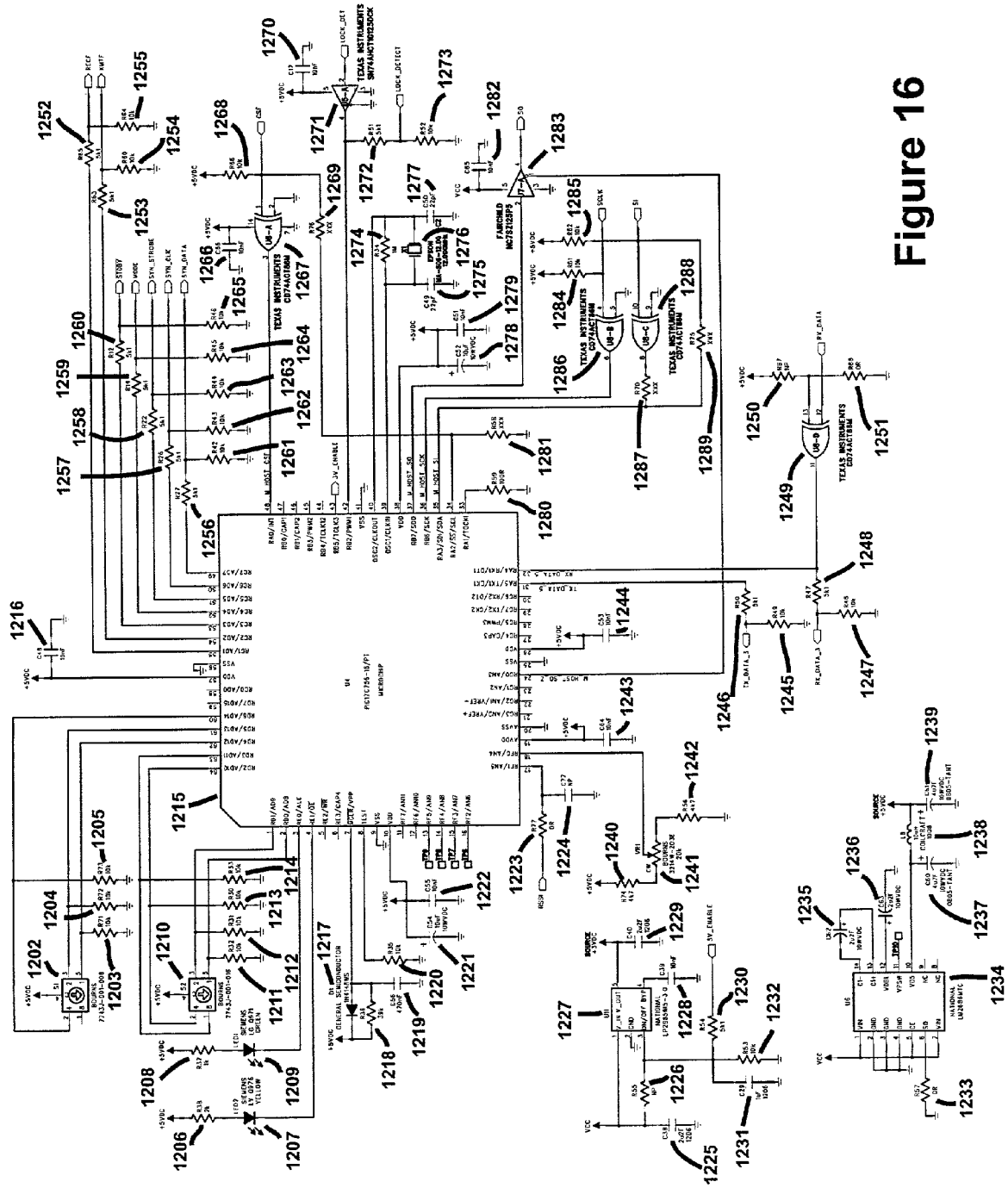

FIGS. 15 and 16 represent the schematic design for the data transceiver 211 circuit board implementation example, which connects to the navigator 260 or the base station 200 using connector 1198 on the data transceiver 211. There are two main components on the data transceiver 211, the data controller 1215, which in this example is a Microchip PIC17C756, and the RF transceiver 1170, which in this example is a Texas Instruments TRF6900. The data controller 1215 handles communications with the navigator 260 or the base station 200 through a serial interface on connector 1198 on the data transceiver 211. The data controller 1215 is also responsible for controlling the RF transceiver 1170 for such things as frequency channel selection. The data controller 1215 also buffers the transmit data to the RF transceiver 1170 and receive data from the RF transceiver 1170. The RF transceiver 1170 acts as the radio transmitter and receiver for the data transceiver 211 for wireless data communications with another data transceiver 211.

Signals on the connector 1198 are defined to operate at 3.3 volts. The data controller 1215, which interfaces with the connector 1198, operates at 5 volts. In order to handle the voltage level difference, level shifting circuits are used. Resistors 1245, 1246, 1247, 1248, 1252, 1253, 1254, 1255, 1256, 1257, 1258, 1259, 1260, 1261, 1262, 1263, 1264, and 1265 act as voltage dividers on outputs from the data controller 1215. XOR gates 1249, 1267, 1286, and 1288 act as level shifters for inputs to the data controller 1215. Resistors 1250, 1251, 1268, 1284, and 1285 provide pull-ups to power and pull-downs to ground for the XOR gates 1249, 1267, 1286, and 1288. Capacitor 1266 provides filtering for power to the XOR gates 1249, 1267, 1286, and 1288. Resistors 1269, 1281, 1287, and 1289 provide selection of SPI or I$^2$C communications between the data controller 1215 on the data transceiver 211 and the base station 200 or the navigator 260. Buffer 1283 allows the serial data output signal from the data controller 1215 to the connector 1198 to be tri-stated. Capacitor 1282 provides filtering for power to the buffer 1283.

Diode 1217, resistor 1218, and capacitor 1219 provide the reset signal to the data controller 1215. The RF transceiver 1170 provides a radio signal strength signal to the data controller 1215 to indicate if another data transceiver 211 has been detected. The resistor 1223 and capacitor 1224 support the radio signal strength signal. The resistors 1240 and 1242 and variable resistor 1241 provide an adjustable threshold voltage for the radio signal strength detection on the data controller 1215. Buffer 1271 and resistors 1272 and 1273 support lock detection of the phase locked loop, or PLL, on the RF transceiver 1170 by the data controller 1215. This lock detection indicates when the RF transceiver 1170 has successfully completed a frequency channel selection. Capacitor 1270 provides power filtering for the buffer 1271. Oscillator 1276 provides the timing for the data controller 1215, with capacitors 1275 and 1277 and resistor 1274 providing the required loading and impedance for the oscillator 1276. Resistors 1220, and 1280 provide pull downs to ground for signals to the data controller 1215. Capacitors 1216, 1221, 1222, 1243, 1244, 1278, and 1279 provide filtering for power to the data controller 1215.

Wireless data communications come into and go out of the data transceiver 211 through the data antenna 212. The switch 1115, controlled by the RF transceiver 1170, selects between the outgoing transmit signal to the antenna and the incoming receive signal from the antenna. Buffer 1103, resistors 1101, 1104, and 1105, and capacitors 1100, 1102, 1106, and 1107 support the selection of the switch 1115 by the RF transceiver 1170. Between the switch 1115 and the antenna 212 are various filters. Inductor 1113 and capacitors 1110, 1111, 1112, and 1114 act as a low pass filter to suppress harmonics on the transmission signal. SAW filter 1109 acts as band pass filter. Capacitor 1108 provides AC coupling of the signal. The receive output from the switch 1115 feeds the low noise amplifier, or LNA, inside the RF transceiver 1170. The inductor 1137 and capacitors 1134, 1135, 1136, and 1138 provide impedance matching for the receive signal to the input of the LNA inside the RF transceiver 1170. The resistor 1117, inductors 1119 and 1121, and capacitors 1116, 1118, and 1120 provide impedance matching for the output of the LNA inside the RF transceiver 1170 to the RF mixer input inside the RF transceiver 1170. Capacitor 1128 provides AC coupling and filter 1129 acts as a band pass filter on the output from the RF mixer inside the RF transceiver 1170. Resistor 1174, inductor 1171, and capacitors 1172 and 1173 act as a frequency shift keying, or FSK, demodulator to demodulate the receive data from the receive signal after it has passed through the band pass filter 1129. Capacitor 1130 provides a reference voltage for the demodulator circuit. Next, the demodulated receive data passes through a low pass filter composed of the resistor 1176 and capacitors 1175 and 1177. Finally, the receive data goes through a data slicer inside the RF transceiver 1170 before being sent to the data controller 1215, where the receive data is buffered before being read by the navigator 260 or base station 200. Capacitor 1178 helps provide sample and hold timing for the data slicer inside the RF transceiver 1170. Transmit data to the RF transceiver 1170 comes from the data controller 1215. Resistors 1168 and 1169 act to modulate the voltage controlled oscillator, or VCO, circuit based on the transmit data. The VCO circuit is composed of the resistors 1156 and 1160, capacitors 1162, 1163, 1165, and 1167, varactors 1161 and 1166 and inductor 1164. The VCO is controlled by the phase locked loop, or PLL, which is inside the RF transceiver 1170. Resistors 1149, 1151, 1152, and 1154 and capacitors 1150, 1153, and 1155 provide filtering for the PLL. Resistor 1148 sets the charge pump current for the PLL. The modulated transmit signal then goes through a power amplifier inside the RF transceiver 1170, before leaving the RF transmitter 1170. The inductor 1142 and the capacitors 1144, 1145, 1146, and 1147 provide impedance matching for the transmit signal to the input of the switch 1115 from the power amplifier inside the RF transceiver 1170.

The oscillator 1191 provides the reference timing for the RF transceiver. Capacitors 1190 and 1192, variable capacitor 1189, and resistors 1187 and 1188 provide the required loading and impedance for the oscillator 1191. The RF transceiver 1170 requires additional filtering for power. Capacitors 1122, 1124, 1125, 1127, 1131, 1133, 1139, 1140, 1143, 1157, 1159, 1179, 1181, 1184, and 1186 and resistors 1123, 1126, 1132, 1141, 1158, 1180, and 1185 provide power filtering for the RF transceiver 1170.

Power for the data transceiver 211 from the connector 1198 is defined as being 3.3 volts. Since most of the digital circuitry on the data transceiver 211 requires 5 volts, the 3.3-volt to 5-volt step-up converter 1234 is used to step-up the power voltage from 3.3 volts to 5 volts. Inductor 1238, resistor 1233, and capacitors 1235, 1236, 1237, and 1239 are required by the step-up converter 1234 to support the step-up converter 1234 functionality. The radio circuitry has an independent power source from the digital circuitry on the data transceiver 211. Voltage regulator 1227, for example, a National Semiconductor Model No. LP29851M5, provides the radio power, with resistor 1226 and capacitors 1225, 1228, and 1229 providing required support for the voltage regulator 1227. In addition, the data controller 1215 is able to control power to the radio circuitry through enabling and disabling the voltage regulator 1227 output. Capacitor 1231 and resistors 1230 and 1232 support the control of the power to the radio circuitry by the data controller 1215.

Resistor 1194 has no impedance and simply provides better debug access to the transmit data signal from the data controller 1215. Switches 1202 and 1210 and resistors 1203, 1204, 1205, 1211, 1212, 1213, and 1214 provide manual selection of the transmit and receive channel as well as setting test modes for debug purposes and are not included for production. LEDs 1207 and 1209 provide visual feedback for debug purposes and are not included for production. Resistors 1206 and 1208 provide additional loading for the LEDs 1207 and 1209 to limit the current going through the LEDs 1207 and 1209. Resistors 1182, 1183 and 1193 are for debug purposes and are not included for production. Capacitors 1195, 1196, 1197, 1199, 1200, and 1201 are for debug and test purposes and are not included for production.

Audio Transmitter Schematics

Figure 17:
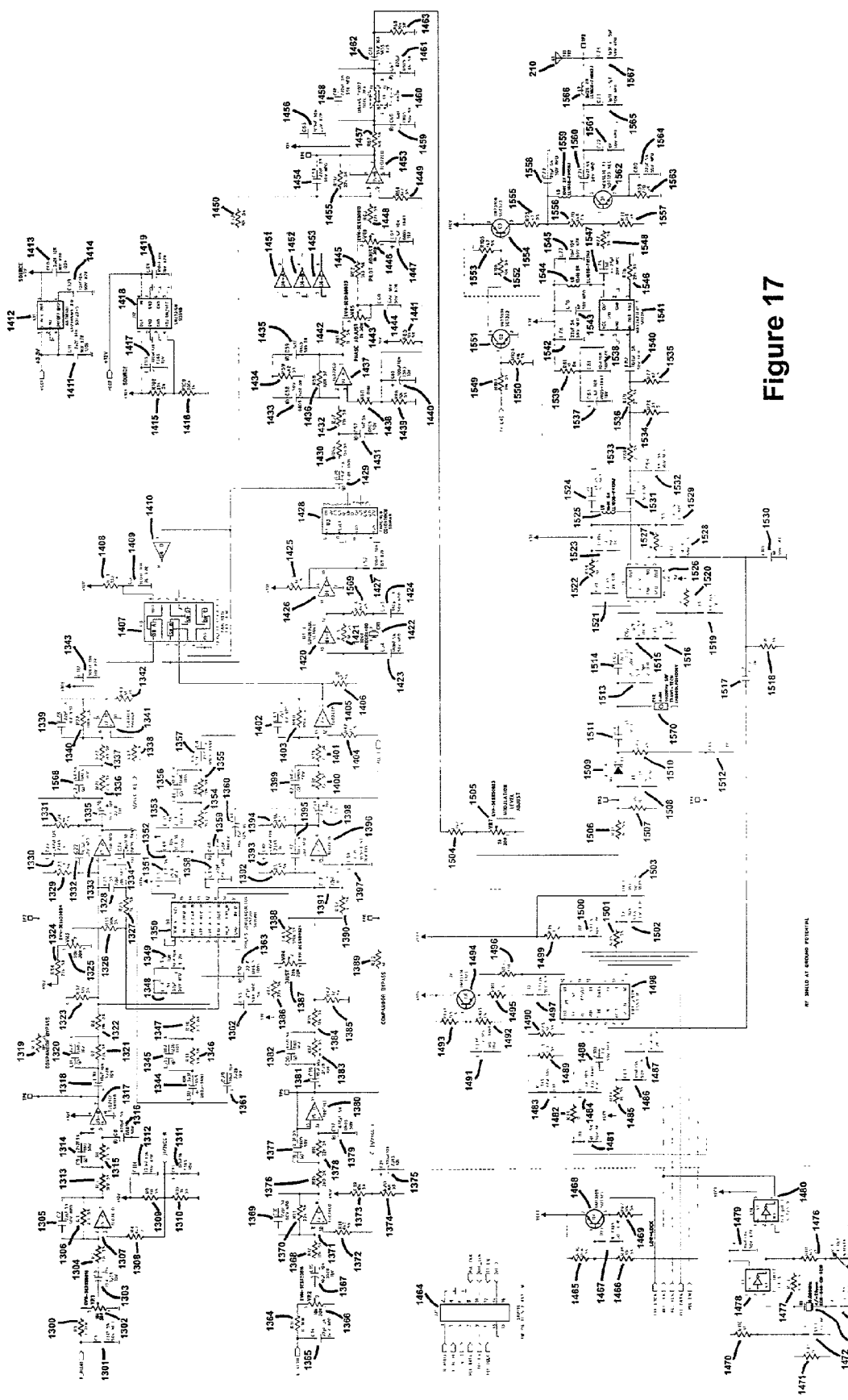
FIG. 17 is a schematic diagram of an audio transmitter in accordance with the present invention.

FIG. 17 represents the schematic design for the audio transmitter 209 circuit board implementation example, which connects to the base station 200 using connector 1464 on the audio transmitter 209. The base station 200 sets the transmission frequency of the audio transmitter 209 through a serial interface with the frequency synthesizer 1498, which in this example is a National Semiconductor LMX2316, on the audio transmitter 209. Oscillator 1473, along with resistors 1470, 1471, 1476, and 1477, capacitors 1472, 1474, 1479, and 1487, variable capacitor 1475, and buffers 1478 and 1480 provide the reference frequency to the frequency synthesizer 1498. Resistors 1482, 1489, 1490, and 1501 and capacitors 1481, 1483, 1484, 1488, 1502, and 1503 provide additional support for the frequency synthesizer 1498. Resistors 1465, 1466, and 1469, capacitor 1467, and transistor 1468 act as a frequency synthesis PLL lock detect circuit to provide PLL lock detection feedback to the base station 200 when transmission frequency changes are made. Transistor 1494, capacitors 1491 and 1497, and resistors 1492, 1493, 1495, and 1496 provide filtering for power to the charge pump inside the frequency synthesizer 1498. Resistors 1485 and 1499 and capacitors 1486 and 1500 provide filtering for digital power to the frequency synthesizer 1498.

Line level stereo audio comes from the base station 200 to the audio transmitter 209 from the connector 1464 on the audio transmitter 209. The stereo audio signals first go through audio filtering and gain adjustment composed of capacitors 1301, 1303, 1305, 1311, 1312, 1314, 1316, 1365, 1367, 1369, 1375, 1377, and 1379, resistors 1300, 1304, 1306, 1308, 1309, 1310, 1313, 1315, 1364, 1368, 1370, 1372, 1373, 1374, 1376, and 1378, variable resistors 1302 and 1366, and op amps 1307, 1317, 1371, and 1380. In order to improve the signal to noise ratio, the stereo audio signals next pass through a dynamic range compression circuit. The compandor 1350, which in this example is a Philips Semiconductors SA572, is configured to operate for compression. Resistors 1321, 1322, 1323, 1324, 1326, 1327, 1329, 1331, 1346, 1347, 1354, 1355, 1383, 1384, 1385, 1386, 1388, 1390, 1392, and 1394, variable resistors 1325 and 1387, capacitors 1318, 1320, 1328, 1330, 1332, 1334, 1335, 1344, 1345, 1348, 1349, 1352, 1353, 1356, 1357, 1358, 1359, 1360, 1361, 1362, 1363, 1381, 1382, 1391, 1393, 1395, 1397, and 1398, and op amps 1333 and 1396 support operation of the compandor 1350 for dynamic range compression of the stereo audio signals. Resistors 1319 and 1389 provide an option to bypass the compression circuit. Capacitor 1351 provides filtering for power to the compandor 1350. Next the stereo audio signals passes through a pre-emphasis circuit to boost the high frequencies in the signals. Resistors 1336, 1337, 1338, 1340, 1342, 1400, 1401, 1403, 1404, and 1406, capacitors 1339, 1399, 1402, and 1568, and op amps 1341 and 1405 make up the pre-emphasis circuit. Capacitor 1343 provides filtering for power to op amps 1333, 1343, 1396, and 1405. After the pre-emphasis circuit, the stereo audio signals go through a stereo encoding process that involves time division multiplexing of the stereo audio signals. The switch 1407, which in this example is a Fairchild Semiconductor CD4066, provides the multiplexing while the oscillator 1422 acts as the timing source for controlling the switch 1407. The counter 1428 divides down the timing from the oscillator 1422 to get the correct multiplexing timing. Capacitors 1423 and 1424, resistors 1421 and 1569, and inverters 1410, 1420, and 1426 support multiplexing timing generation by the oscillator 1422 and counter 1428. Resistor 1408 and capacitor 1409 provide power filtering for the switch 1407. Resistor 1425 and capacitor 1427 provide power filtering for the counter 1428 and inverters 1410, 1420, 1426, 1451, 1452, and 1453. Inverters 1451, 1452, and 1453 are unused. The counter 1428 also provides the timing for a pilot tone that is used by the audio receiver 241 in the repeater 240 to detect a transmission from the audio transmitter 209. Resistors 1430, 1432, 1434, 1436, 1438, 1439, 1441, 1442, 1445, 1448, and 1449, variable resistors 1443 and 1446, capacitors 1429, 1431, 1433, 1435, 1440, 1444, and 1447, and op amp 1437 are responsible for converting the square wave timing from the counter 1428 to a sine wave as well as providing phase, level, and gain adjustments on the pilot tone. Then the pilot tone signal and multiplexed audio signal are combined into one signal for transmission, with resistors 1450, 1455, 1457, and 1463, capacitors 1454, 1458, 1459, 1461, and 1462, variable inductor 1460, and op amp 1453 acting as the combiner circuit. Capacitor 1456 provides power filtering for the op amps 1437 and 1453. The combined signal modulates the VCO circuit through resistor 1504 and variable resistor 1505. The VCO circuit is composed of resistors 1506, 1507, 1510, 1518, 1520, 1527, and 1533, capacitors 1508, 1511, 1512, 1513, 1514, 1515, 1516, 1517, 1519, 1524, 1528, 1529, 1530, 1531, and 1532, varactor 1509, inductor 1525, ceramic resonator 1570, and RF oscillator 1526. Resistor 1522 and capacitors 1521 and 1523 provide filtering for power to the RF oscillator 1526. The signal from the VCO circuit goes to the VCO buffer amplifier 1541, with resistors 1534, 1535, 1536, 1539, and 1546, capacitors 1537, 1538, 1540, 1542, 1543, and 1545, and inductor 1544 providing required support for the VCO buffer amplifier 1541. The signal from the VCO buffer amplifier 1541 is then sent to a power amplifier circuit composed of resistors 1548, 1556, 1557, and 1563, capacitors 1547, 1558, 1560, 1561, and 1564, inductor 1559, and transistor 1562. The base station 200 is able to enable or disable the power amplifier circuit from a control signal to the audio transmitter 209. The control signal comes to the audio transmitter through the connector 1464 on the audio transmitter 209. The control signal enables or disables the power amplifier circuit through the switch circuit composed of resistors 1549, 1550, 1552, 1553 and transistors 1551 and 1554. Finally the signal to transmit passes through the output filter composed of inductor 1566 and capacitors 1565 and 1567 before going out the audio antenna 210.

The audio transmitter 209 is supplied power at 3.3 volts and 12 volts from the base station 200 through the connector 1464 on the audio transmitter 209. Voltage regulator 1412 converts the 3.3-volt power to 3-volt power. Capacitors 1411, 1413, and 1414 support required filtering for the voltage regulator 1412. Voltage regulator 1418 converts the 12-volt power to 10-volt power. Capacitors 1417 and 1419 support required filtering for the voltage regulator 1418. Resistors 1415 and 1416 select the desired output voltage level for the voltage regulator 1418.

Software

The software for the system, illustrated in FIGS. 18-24, is used to retrieve digital audio data from audio files on a local disk and/or Internet streaming audio data. The system organizes the audio data as a playlist. The playlist is transferred to the remote device 260 (FIGS. 1 and 26). A user may simply select and play a clip by using control buttons, generally identified with the reference numeral 1600, on the remote device 260. In response, the remote device 260 sends commands to the base station 200 (FIG. 1) which transfers the audio signals to a repeater 240 allows remote audio devices, such as a stereo 105 (FIG. 1) or an FM radio, to play the clip by way of a repeater 240.

Figure 18:
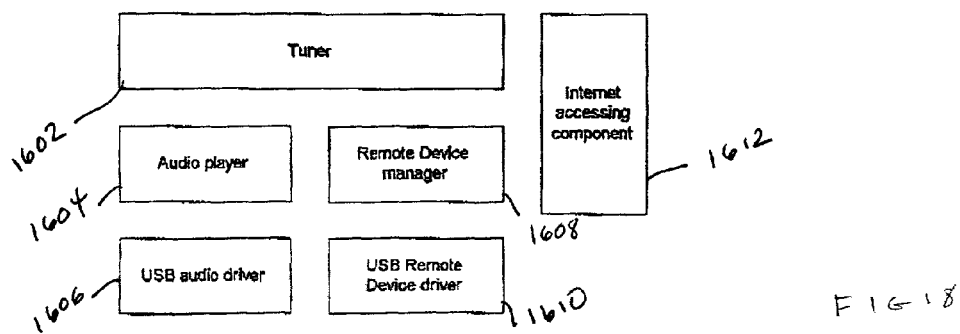
FIG. 18 is a block diagram of the various PC software modules which form the present invention.

FIG. 18 is a block diagram of the software modules resident in the host PC 100 for controlling the system. These software modules include a tuner software module 1602, an audio player software module 1604, a USB audio driver software module 1606, a remote device manager software module 1608, a remote device driver software module 1610 and an Internet access software module 1612. FIGS. 19-24 are representative flow diagrams for each of the software which are modules discussed below.

Tuner

The tuner software module 1602 provides a user interface which allows a user to edit and create playlists, download locally stored digital audio files 112 (FIG. 1) or streamed audio content 111 from the Internet to the host PC 100. The tuner is may be implemented as a software juke box, such as Microsoft Windows Media Player Version 7.0.

The configuration of the tuner software module 1602 may be saved into a local database. The database may be implemented using CodeBase 6.5 database engine.

Audio Player

The audio player software module 1604 (FIG. 18) plays the audio and runs in the background and functions in a similar manner as other audio players, such as Real Networks G2 Player and Microsoft Windows Media Player. The audio player software module 1604 is adapted to play local and Internet digital music files, Internet radio stations and other Internet streaming audio sources.

Figure 19:
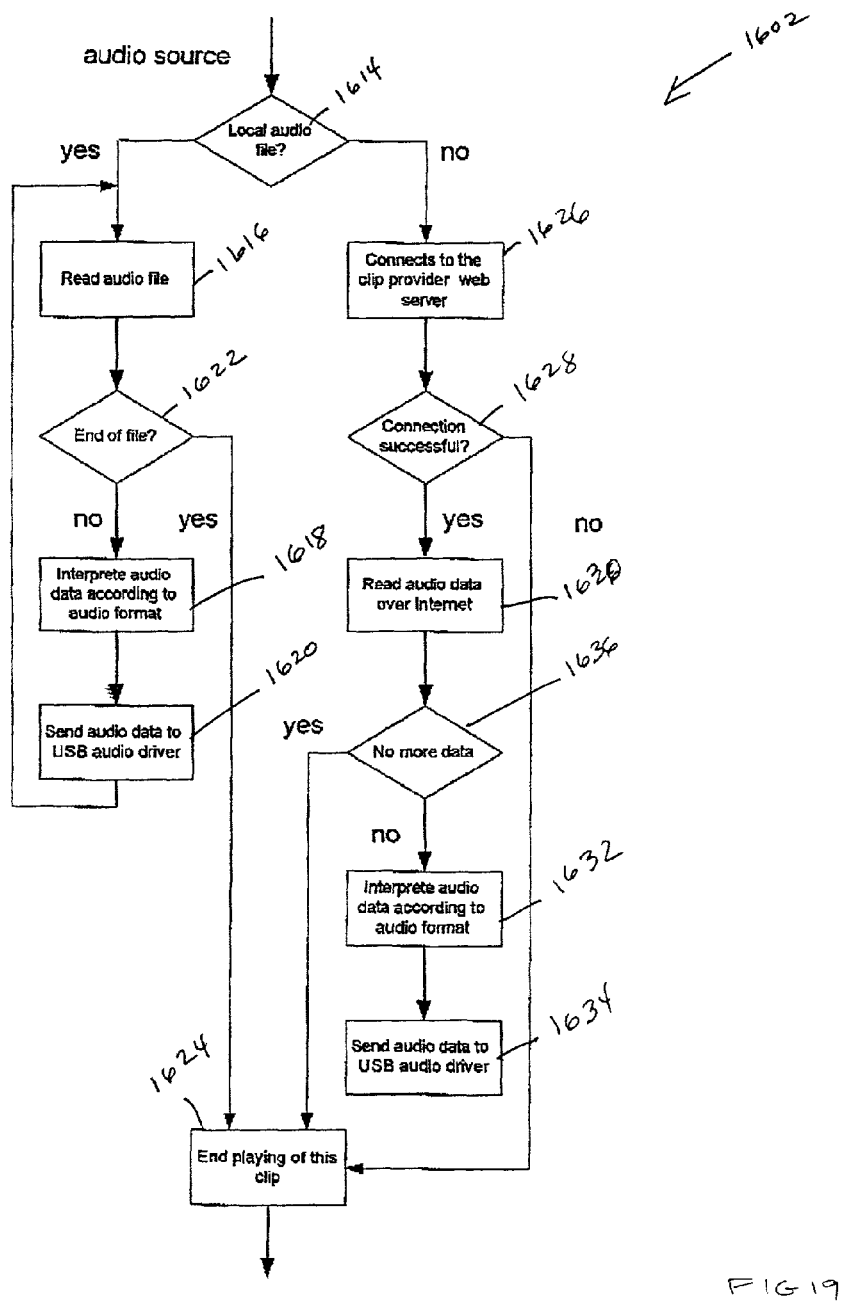
FIG. 19 is a flow diagram for the audio player software module in accordance with the present invention.
Figure 20:
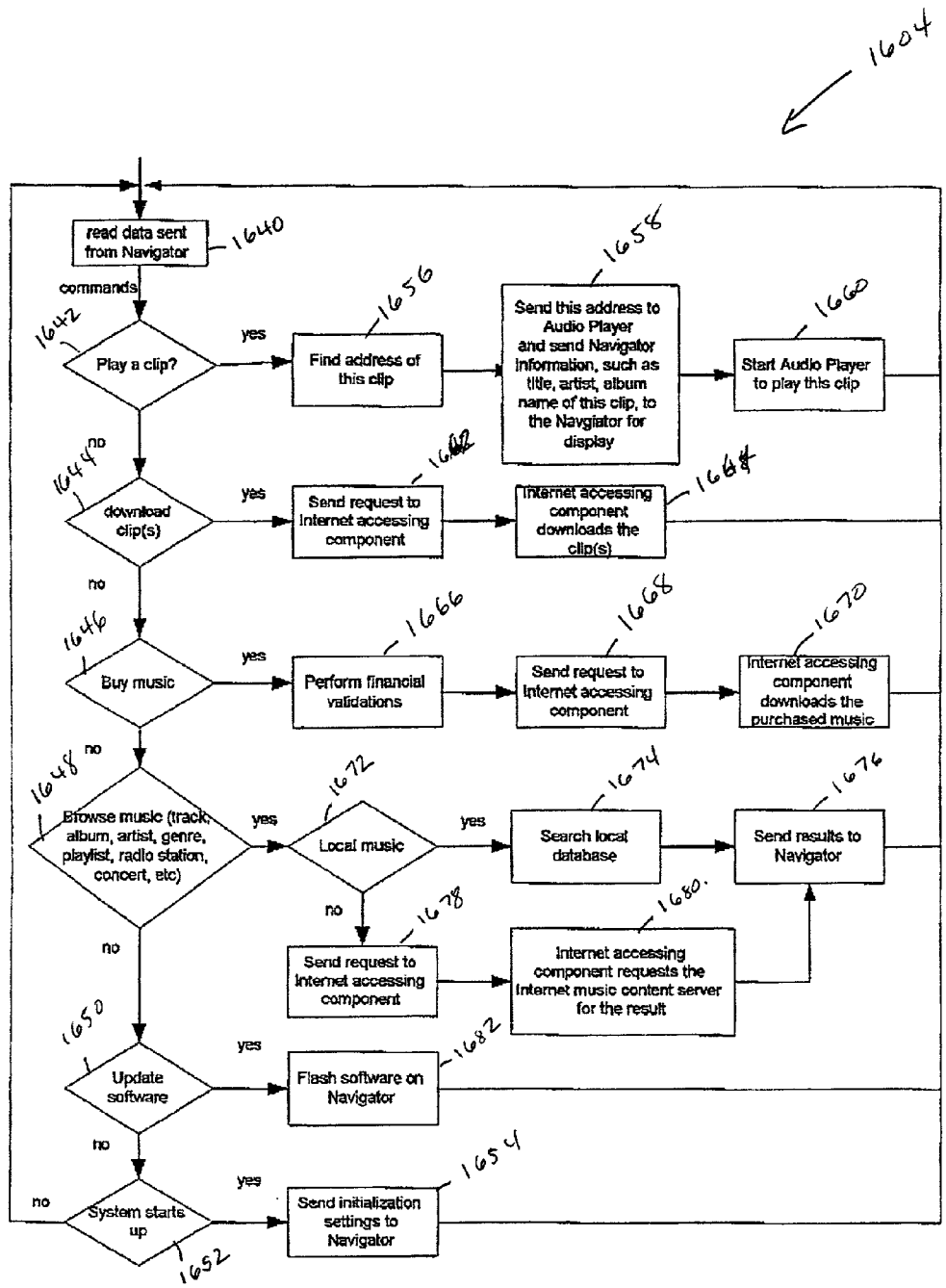
FIG. 20 is a flow diagram for the remote device manager software module in accordance with the present invention.

Referring to FIG. 19, initially, in response to an audio source, the system checks in step 1614 whether the audio file is a local audio file. If so, the system reads the entire audio file in step 1616. The system interprets the audio data according to audio format and sends the audio data to the USB audio driver software module 1606 in steps 1618 and 1620 until the entire file is read. Once the system determines that the entire file is read, the system issues a command in step 1624 that the entire file has been read.

If the system determines in step 1614 that the audio source is not a local audio file, the system automatically connects to the clip provider web server in step 1626. If the connection to the clip provider web server is successful, as determined in step 1628, the system reads the audio data over the Internet in step 1626. The audio data is interpreted according to audio format is step 1632 and sent to the USB audio driver 1606 in step 1634 until the entire clip has been played as indicated in step 1636. After the entire clip has been played, the system goes to step 1624 and issues a command to end playing of the clip.

Remote Device Manager

The remote device manager software module 1608 services requests by the remote device 260. As such, commands from the remote device 260 are read in step 1640. The system then decodes the commands in steps 1642, 1644, 1646, 1648 and 1650. During initial start up, as indicated in step 1652, the system sends initialization settings to the remote device 260 is 1654 and returns to step 1640 to await additional commands.

If the system determines that the command from the remote device 260 is a command to play a clip, as determined in step 1642, the system finds the address of the clip in step 1656 and sends the address of the music clip to the audio player software module 1604 and optionally other information, such as the title, artist, album and name of clip to the remote device 260 for display in step 1658. In step 1660, the system initiates the audio player 1604 software module to play the clip. After the clip is played, the system loops back to 1640.

If the system determines that the command from the remote device 260 is to download a clip as ascertained in step 1644, the system sends the request to the Internet accessing components software module 1612 in step 1646 which causes the clip to be downloaded in step 1648. After the clip is downloaded, the system returns to step 1640.

If the system determines in step 1646 that the command from the remote device 260 is to buy music, the system performs a financial validation in step 1666. Once the validation is complete, the request to purchase music is sent to the Internet accessing component software module 1612 in step 1668 which, in turn, downloads the purchased music in step 1670.

If the system determines in step 1648 that the command from the remote device 260 is to browse music, the system first determines in step 1672 whether the music is a locally stored digital audio file 112 (FIG. 1) or whether the music is streamed audio content 111 in step 1672. If the music is local music, the system searches a local database in step 1674 and sends the results to the remote device 260 in step 1676. However, if the music is streamed audio content 111, the system sends a request to the Internet accessing component module 1612 (FIG. 18) in step 1678 and requests the Internet music content server for the result in step 1680. The system then sends the results to the remote device 260 in step 1676.

The system may also contain certain utilities. For example, the system may contain a utility for updating software on the remote device 260. Thus, if the system determines in step 1650 that the command from the remote device 260 is to update software, the system flashes the software on the remote device 260 in step 1682 and returns to step 1640.

USB Audio Driver

Figure 21:
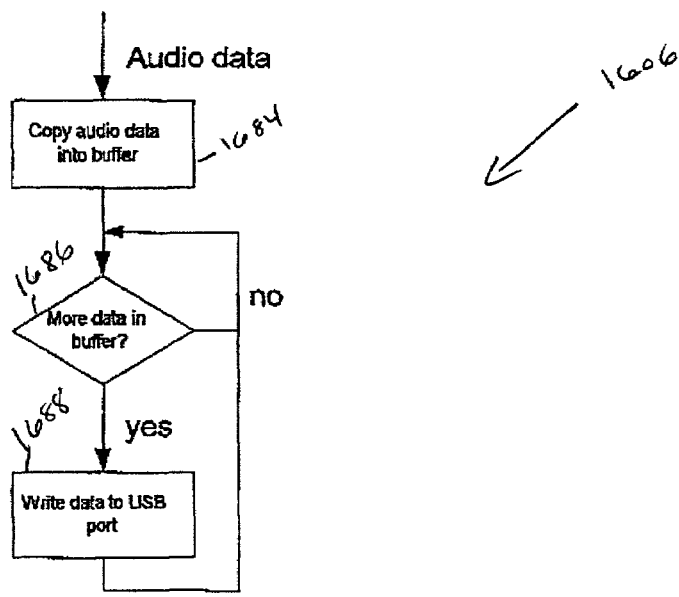
FIG. 21 is a flow diagram of the audio driver software module in accordance with the present invention.

The USB audio driver software module 1606 receives audio data from the audio player software module 1604 and sends to the base station 200 (FIG. 1) by way of the USB bus 103. A flow diagram for the USB audio driver is illustrated in FIG. 21. In response to audio data, the USB audio driver copies the audio driver data into a local buffer in step 1684. After the audio data is copied to a local buffer, the system writes the data from the local buffer to a USB port on the host PC in steps 1686 and 1688. The USB audio driver continues writing the audio data to the USB port until all of the data and the local buffer as been written to the USB port.

USB Remote Device Driver

The USB remote device driver software module 1610 receives data and commands from the remote device manager software module 1608 (FIG. 18) and writes to the remote device 260 (FIG. 1) by way of a USB port. The USB remote device driver software module 1610 also receives data from the remote device 260 by way of the USB port and forwards it to the remote device manager software module 1608.

Figure 22:
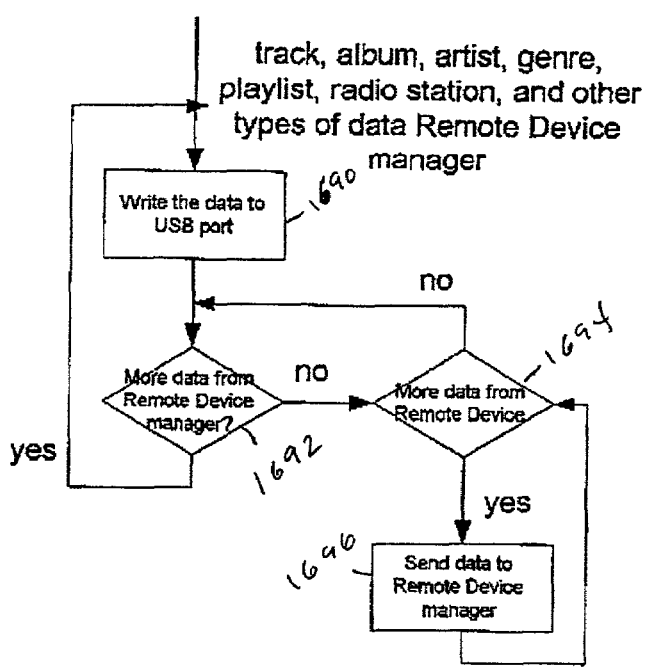
FIG. 22 is a flow diagram of the remote device driver software module in accordance with the present invention.

A flow diagram for the USB remote device driver software module 1610 is illustrated in FIG. 22. The USB remote device driver 1610 is responsive to the remote device manager software module 1608 for passing various data, such as track, album, artist, genre, playlist, radio station or other types of data to the remote device manager device driver software manager 1608. This information is written to a USB port on the host PC 100 in step 1690. As mentioned above, the USB remote device driver software module 1610 provides bidirectional communication between the remote device 260 and the remote device manager software module 1608 and the remote device 260 in steps 1692, 1694 and 1696.

Internet Accessing Component

Figure 23:
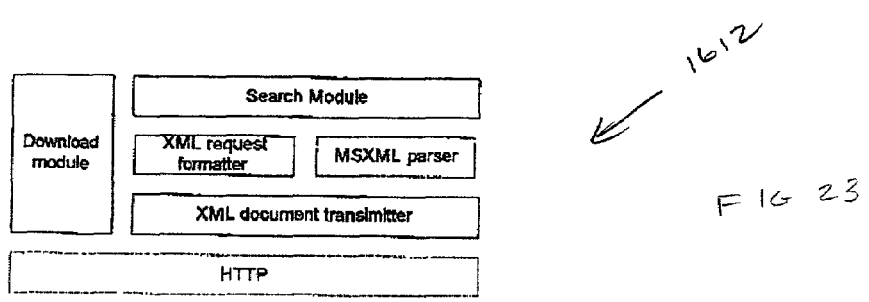
FIG. 23 is a block diagram of an Internet accessing software module in accordance with the present invention.

The Internet accessing component software module 1612 communicates with the Internet to retrieve music data, such as artists, albums, tracks and radio stations. Internet accessing component software module 1612 also manages music downloads and other Internet accesses. An exemplary architecture for the Internet accessing component software module 1612 is illustrated in FIG. 23. The Internet accessing component software module 1612 communicates with servers on the Internet using hypertext transfer protocol (HTTP). Data may be presented in extensible mark-up language (XML) format and XML parser, available from Microsoft Corporation may be used to parse the XML documents.

Remote Device Manager Software

Figure 24:
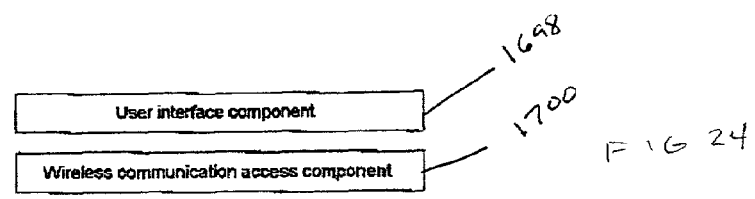
FIG. 24 is a block diagram of a basic user interface structure.

FIG. 24 illustrates the local software within the remote device 260. The local software includes a user interface component 1698 as well as a wireless communication access component 1700. These components 1698 and 1700 are used to send user's requests to the remote device manager software module 1608 (FIG. 18) and provide data to the user from the remote device manager software module 1608 by way of the USB remote device driver software module 1610.

Remote Device

Figure 25:
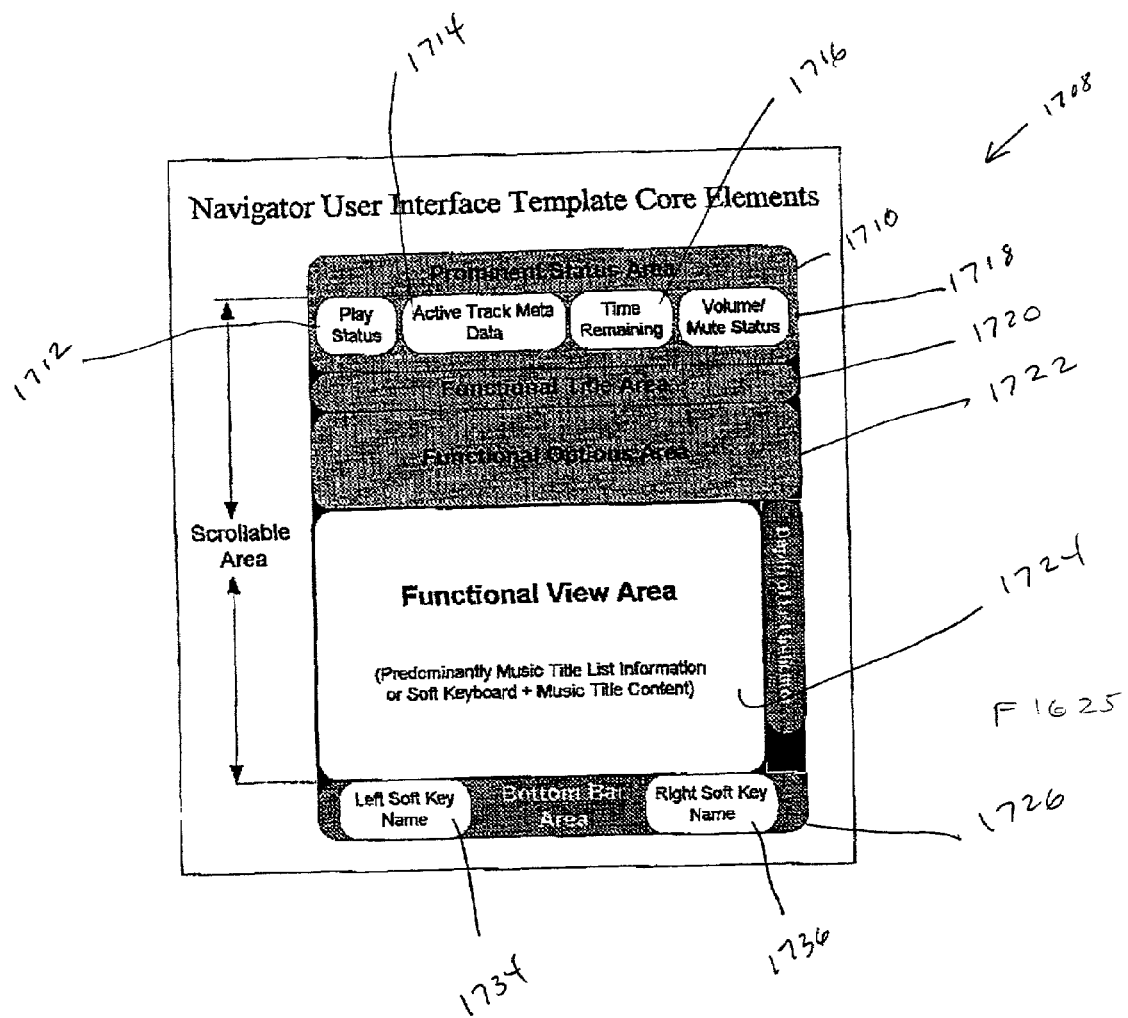
FIG. 25 is an exemplary user interaction diagram.
Figure 2C:
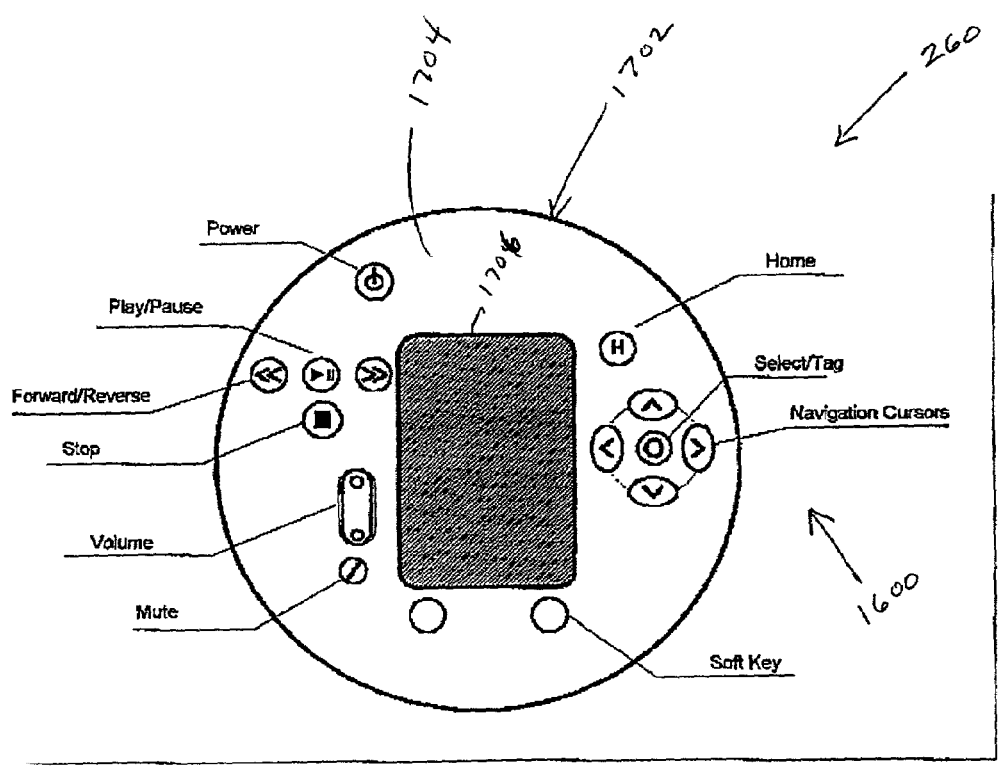
Figure 27:
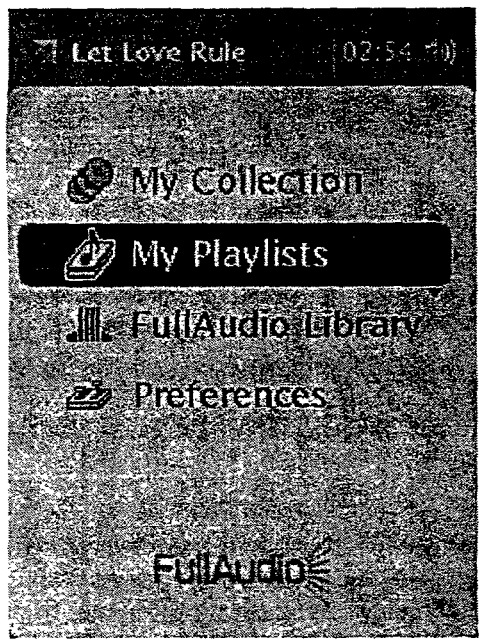
FIGS. 27-35 are exemplary screen shots for display on the remote device in accordance with the present invention.

An exemplary embodiment of the remote device 260 is illustrated in FIG. 26. As shown, the remote device 260 is housed in a housing 1702 and includes control panel portion 1704 which may carry a number of control buttons 1600 as well as a display 1704 which forms a user interface, for example, as illustrated in FIG. 25 and described below.

The use of the control buttons 1600 on the control panel portion 1704 are merely exemplary. It is also contemplated that the control buttons 1600 can be integrated into a touch-screen display, for example, as manufactured by Samsung. In such an embodiment, the remote device 260 would consist of simply the display 1706 mounted on the control panel 1704. It is also contemplated that any number of the control buttons 1600 can be incorporated into a touch-screen display such that some of the hardware control buttons 1600 remain as hardware control buttons as some are integrated into the touch-screen display 1706.

Remote Device Manager User Interface

Figure 36A:
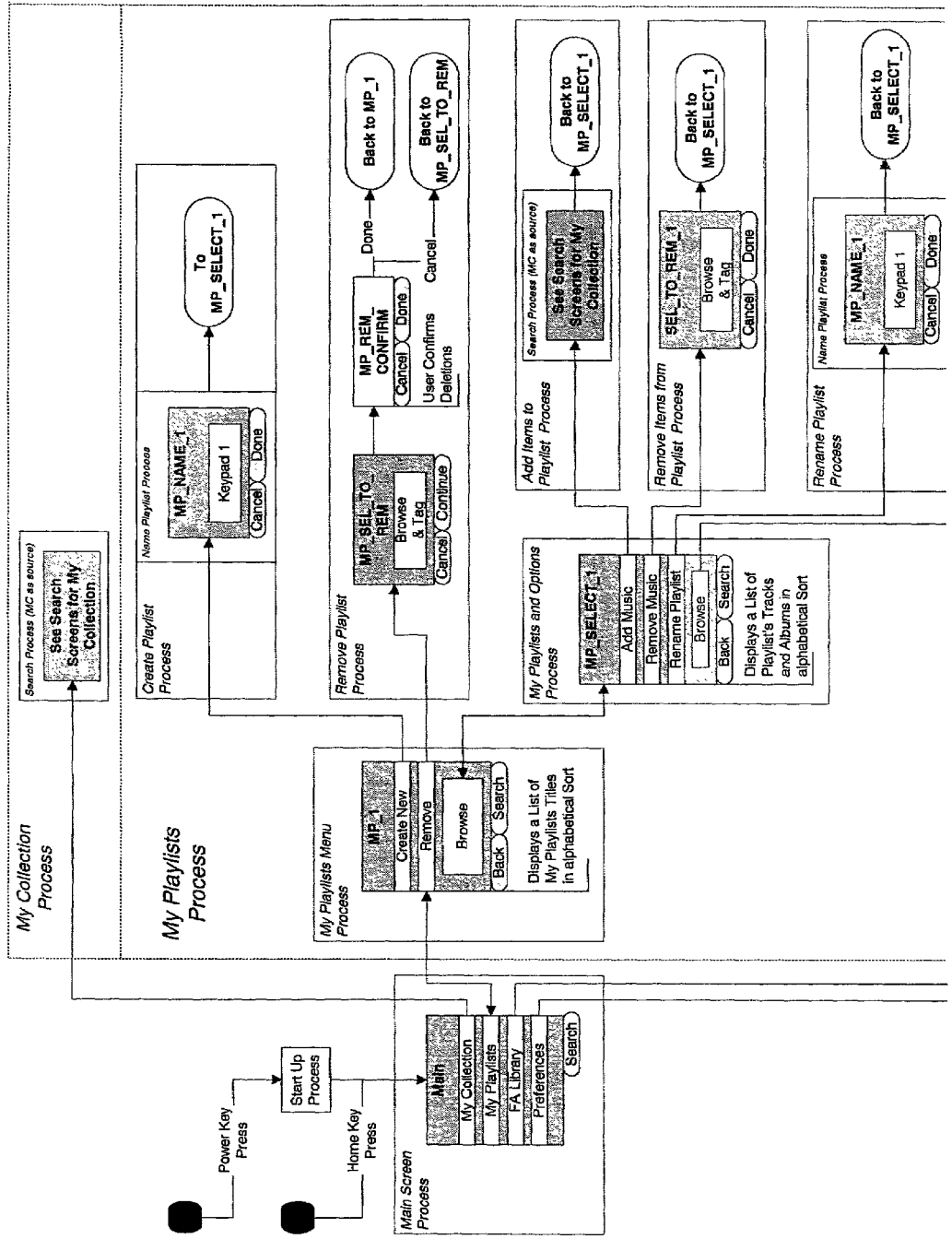
FIGS. 36A and 36B are block diagrams of the navigator software architecture in accordance with the present invention.
Figure 36B:
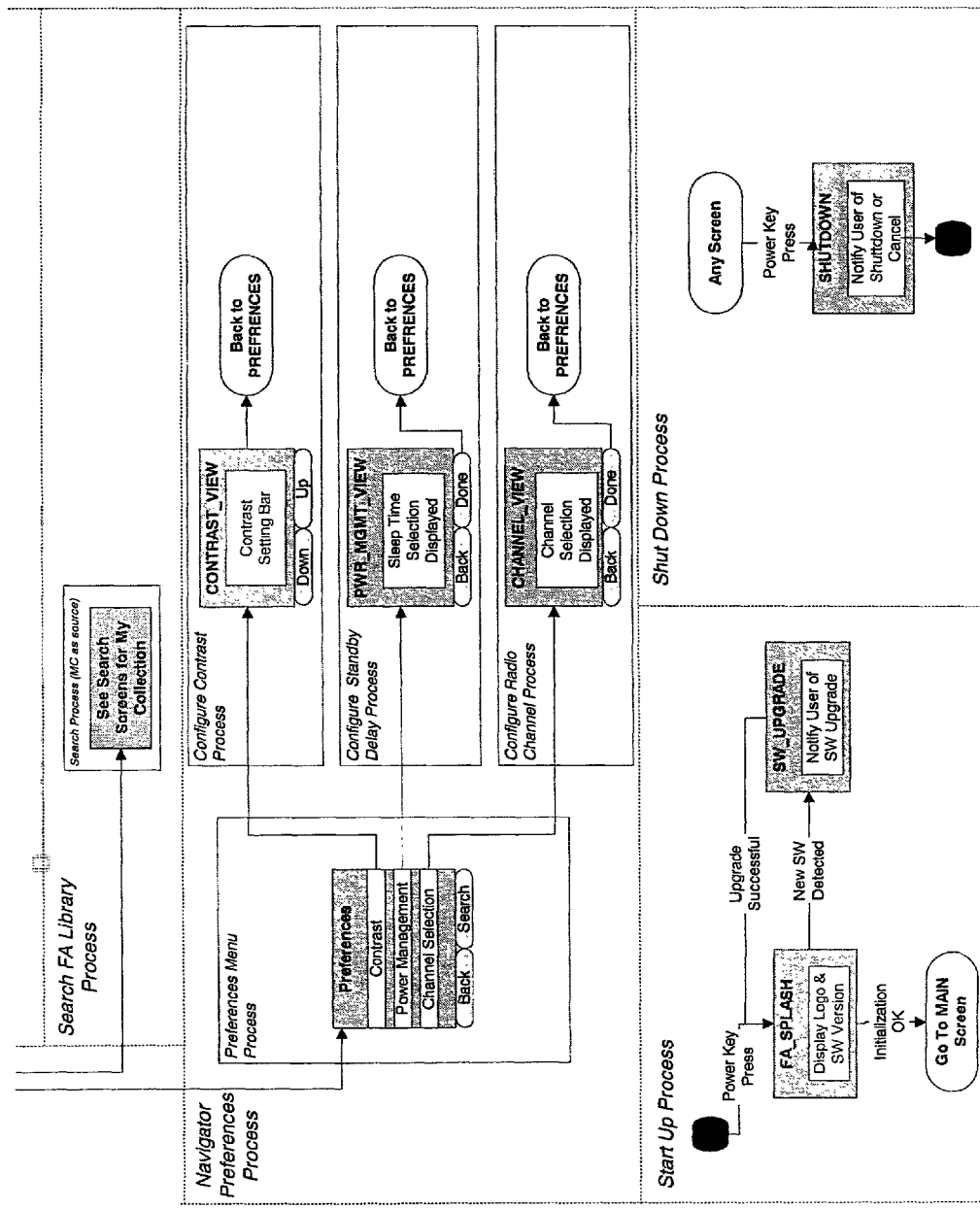
Figure 38:
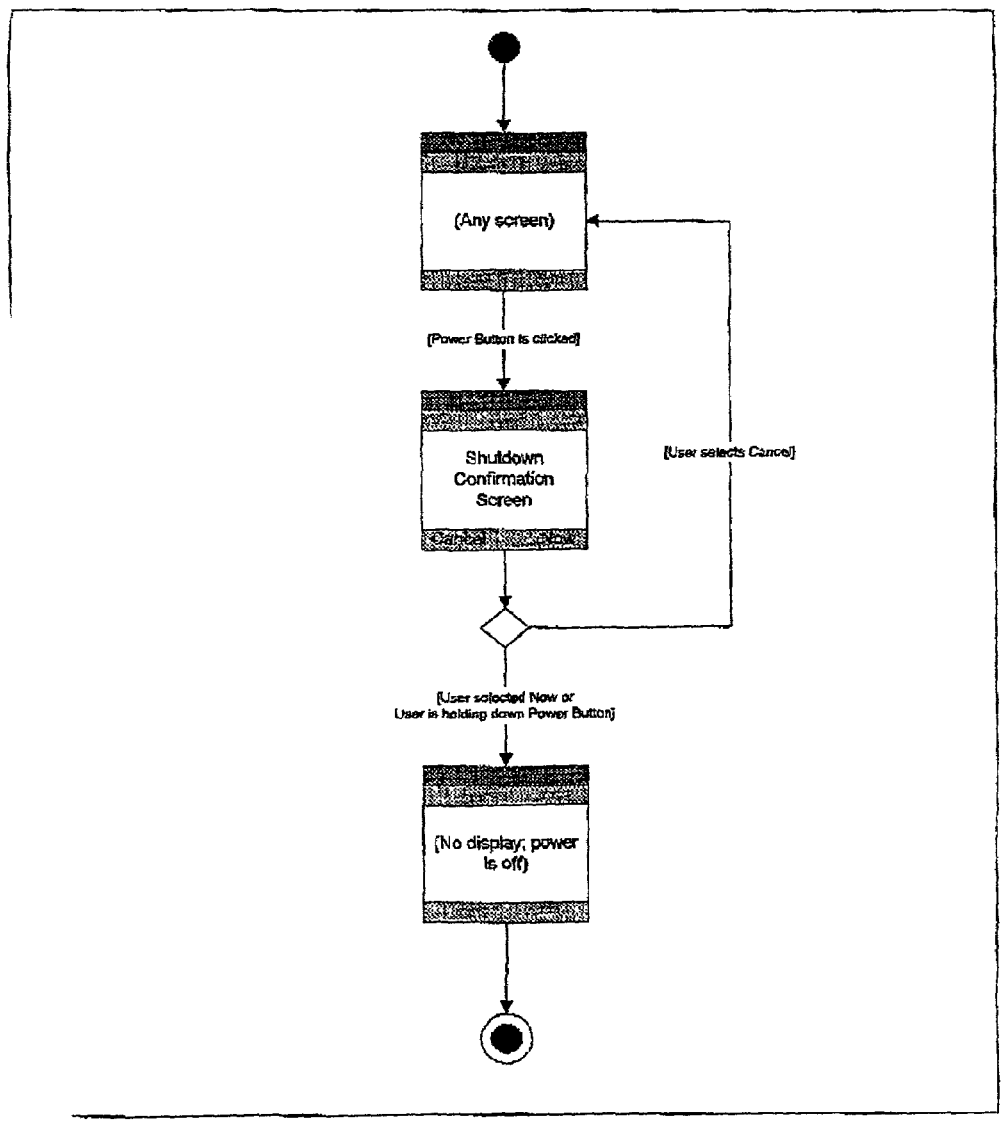
Figure 39:
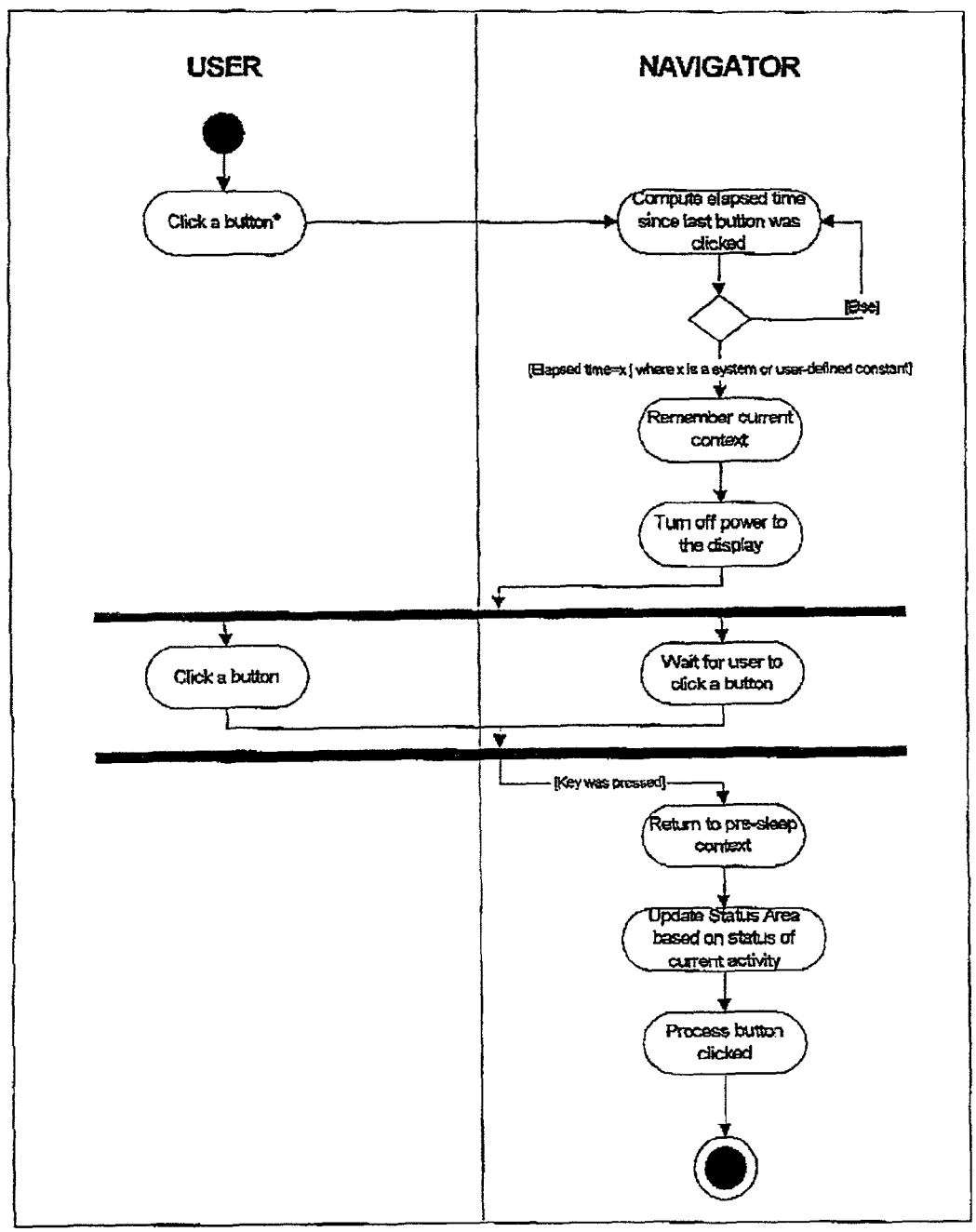
Figure 40:
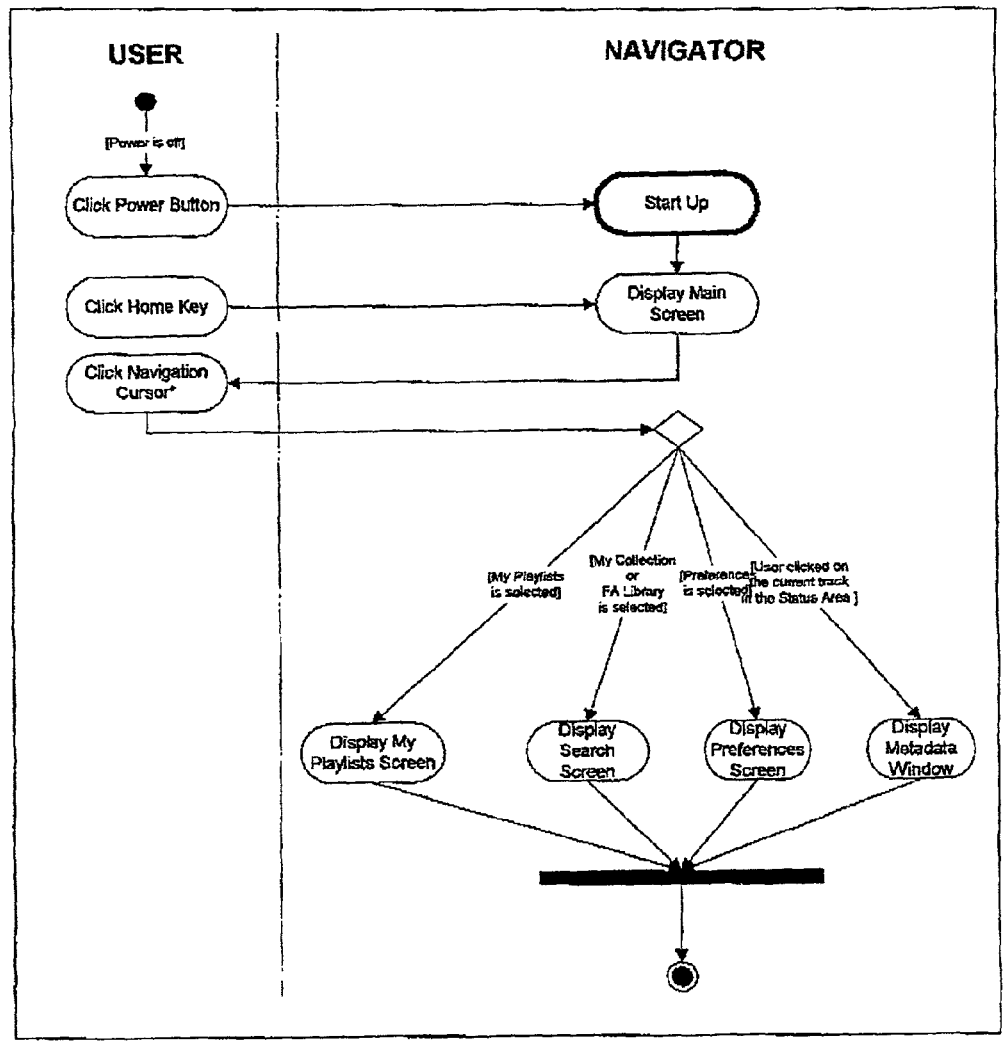
Figure 41:
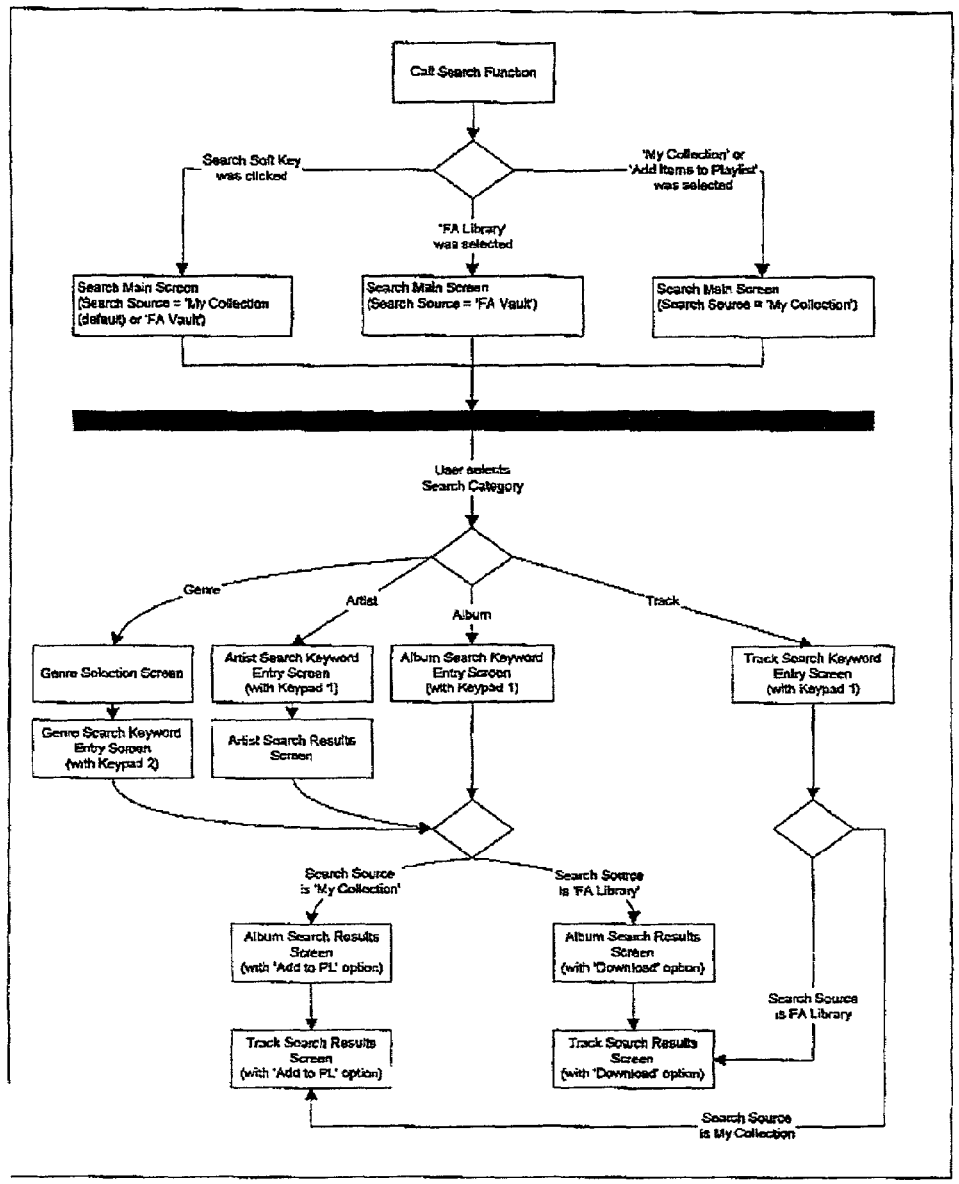

An exemplary navigation schematic for navigating through the various screens available by the remote device 260 is illustrated in FIGS. 36A and 36B. The screens illustrated in FIGS. 27-35 are merely exemplary screens. As shown in the navigation schematic in FIGS. 36A and 36B, the various configurations of the user interface 1708 are shown for all of the various configurations of the system. Exemplary configurations are illustrated in FIGS. 31-35. In addition, scenario-oriented user interaction diagram for various conditions such as shut-down, power save mode and wake-up main screen and search.

As indicated above, the remote device 260 includes a display 1706 for providing a user interface, for example, as illustrated in FIG. 25. The user interface, generally identified with the reference numeral 1708, may include a prominent status area which may include a play status area 1712 for displaying the status of a particular sound clip. The prominent status area 1710 may also include an active track meta data portion 1714 for displaying the particular soundtrack to which the current clip belongs. The prominent status area 1710 may also include a time remaining portion 1716 and volume/mute status portion 1718. The time remaining portion 1716 identifies the remaining time in a sound clip presently selected. The volume/mute status portion 1718 identifies the mute status of the device.

Figure 28:
Figure 30:
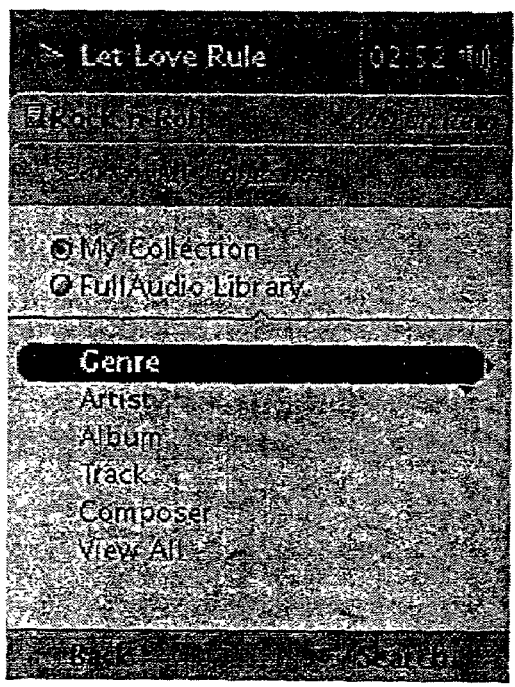
Figure 31:
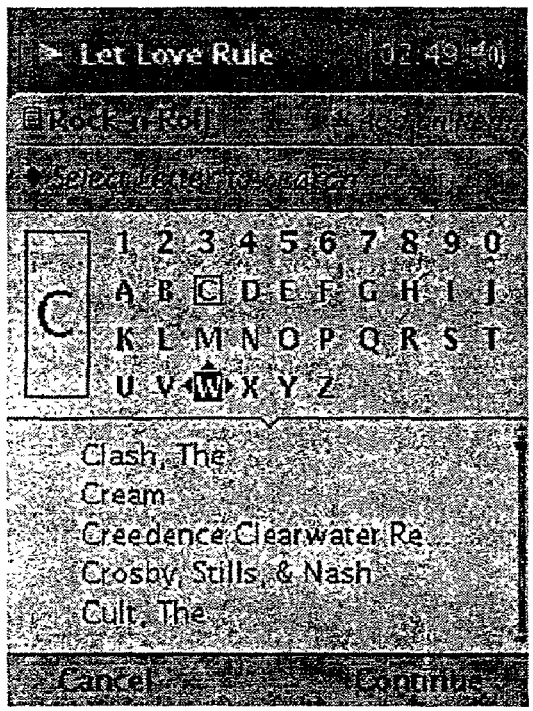
Figure 32:
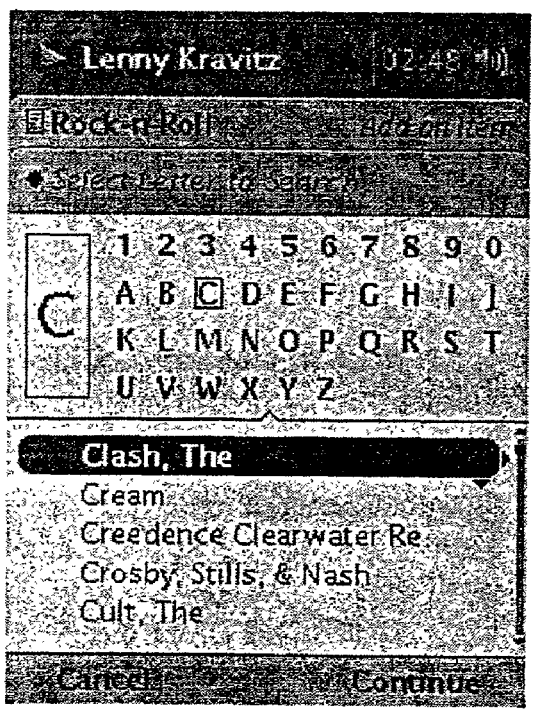

In addition to the prominent status area 1710, the user interface may also include a functional title area 1720 and a functional options area 1722 as well as a functional view area 1724 and bottom bar area 1726. The functional title area 1720 may be used to display current selections, for example, selections from the home screen 1728 (FIG. 27) or selections from intermediate screens such as the screen 1730 (FIG. 30). The functional options area 1722 is similar to the functional title area and displays options for selection, for example, as illustrated in FIG. 28. The functional view area 1724 may be used to predominately display music title list information, musical title content or may provide an on-screen keyboard 1732, for example, as illustrated in FIGS. 31 and 32.

The bottom bar area 1726 may include a left soft key 1734 and right soft key 1736. The left soft key 1734 and 1736 may be used for paging through the screens and issuing commands. Exemplary soft keys include "back", "search", "continue", "add items", for example as illustrated in FIGS. 28-35.

Exemplary screens are illustrated in FIGS. 27-35. Initially on power-up, a home screen 1728 may be displayed. The home screen 1728 enables the user to select one of the options in the functional view area 1728. As shown, assuming "My Playlists" is selected from the home screen 1728 in FIG. 27, the next screen 1740 is illustrated in FIG. 28. In this screen, "My Playlist" is now displayed in the functional title area 1720. The various options available in this state are displayed in the functional options area 1722.

In the example illustrated in FIG. 28, a user is given the option of creating a new playlist or removing a playlist. In addition, a list of current user playlists is displayed in the functional view area 1724. Assuming a user desires to make a selection from a current user playlist, the cursor is moved to the desired playlist, for example, by way of the navigation cursor buttons 1600 on the control panel 1704. As shown, a "Rock-n-Roll" playlist has been selected in FIG. 28.

Figure 29:
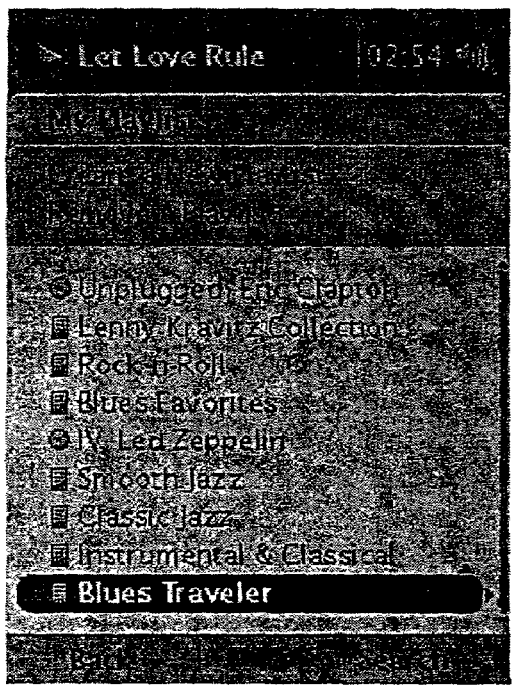

FIG. 29 illustrates another screen shot in which the navigation cursor is moved to the "Blues Traveler" selection in the functional view area 1724. Assuming "Rock-n-Roll" has been selected, the system goes to screen 1744 as illustrated in FIG. 30. In this screen, the functional title area 1720 prompts the user with a search. The functional options area 1722 enables the user to search from various sources. After selecting one of the options in the functional options area 1722, an additional number selectable options, selectable by way of the navigation cursors, are presented in the functional view area 1724. The options presented in the functional view area 1724 provide the user with various options.

The screen 1732 and 1746, illustrated in FIGS. 31 and 32 respectively, illustrate the use of the on-screen keyboard to enable searching. In particular, the on-screen keyboard allows data to be searched by simply selecting a letter by way of the navigator buttons on the on-screen keyboard. In this example, illustrated in FIGS. 31 and 32, all of the playlists by artists are then illustrated in a lower portion of the functional view area 1724, which allows the particular composer to be selected by simply scrolling with the navigator buttons. Once a particular composer is selected, the system presents screen 1748, which identifies various compositions by the selected composer in the functional view area 1724. The various compositions can be selected by way of the select/tag control button 1600 on the control panel 1704.

Figure 33:
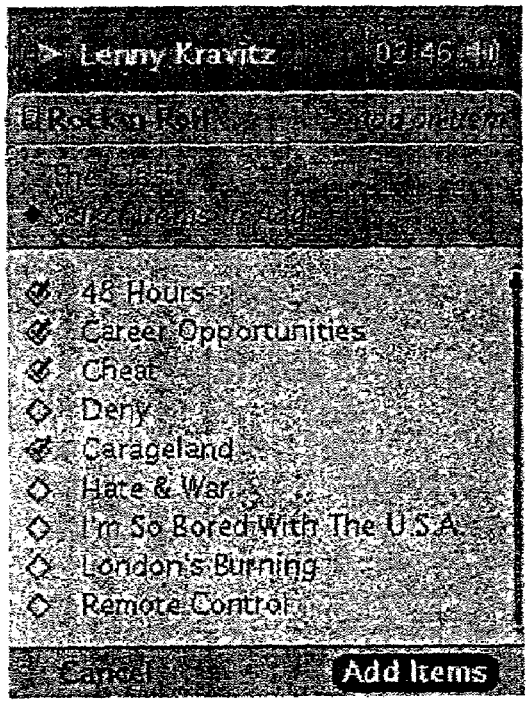
Figure 34:
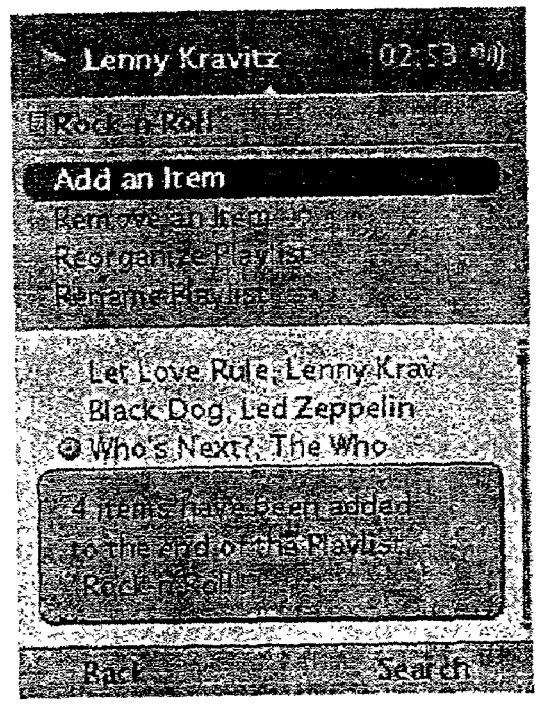
Figure 35:
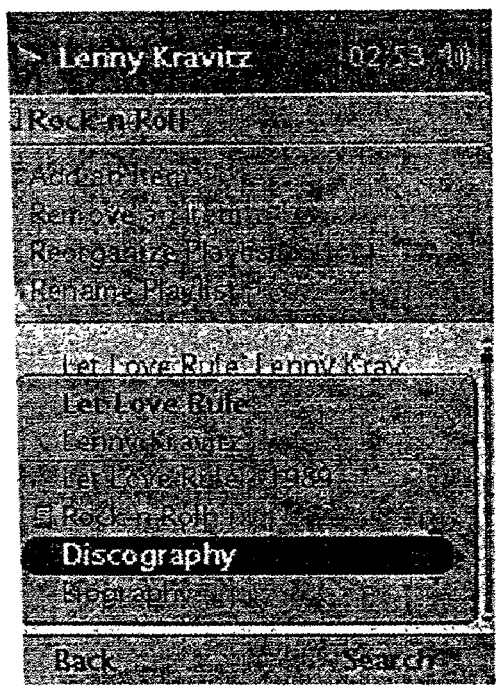

As shown in FIG. 33 four (4), compositions have been selected. The soft key 1736 which, in this example, is an "add items" command, allows the selected compositions to be added to the playlist. As illustrated in screen 1750 (FIG. 34), the functional view area 1724 indicates that the four (4) selected items have been added to the end of the "Rock-n-Roll" playlist.

After the items have been added to the playlist, the screen 1752 (FIG. 35) is presented. This screen allows various user options such as adding additional items to the playlist, removing items from the playlist, reorganizing the playlist and renaming the playlist.

Obviously, many modifications and variations of the present invention are possible in light of the above teachings. Thus, it is to be understood that, within the scope of the appended claims, the invention may be practiced otherwise than as specifically described above.

We claim:

1. A system for enabling digital audio data files to be played on a remote conventional audio device, the system comprising:
   a host PC configured to be connected to the Internet, said host PC configured to store digital data files and receive streaming digital data files; and
   a playback system including a base station, said base station remote from said host PC and configured to be operably connected to said host PC and coupled to one or more conventional playback devices, said base station configured to receive said digital data files from said host PC and convert said digital data files to a predetermined format compatible with one or more conventional playback devices defining converted digital files, said base station including a receiver for receiving said digital data files and a transmitter for transmitting said converted digital data files to said one or more conventional playback devices.

2. The system is recited in claim 1, wherein said conventional device is a radio.

3. The system is recited in claim 2, wherein said radio is an FM radio.

4. The system is recited in claim 1, wherein said playback system is configured to receive audio signals from said base station and provide an audio output suitable for a conventional stereo.

5. The system is recited in claim 1, further including a remote control device, remote from said playback system, for controlling said transmission of said digital data files to said base station.

* * * * *